(12) United States Patent
Ueki et al.

(10) Patent No.: US 7,151,580 B2
(45) Date of Patent: Dec. 19, 2006

(54) REFLECTIVE DISPLAY DEVICE AND PRISM ARRAY SHEET

(75) Inventors: Shun Ueki, Nara (JP); Kiyoshi Minoura, Tenri (JP); Masahiko Tomikawa, Funabashi (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/142,535

(22) Filed: Jun. 2, 2005

(65) Prior Publication Data

US 2005/0213001 A1 Sep. 29, 2005

Related U.S. Application Data

(62) Division of application No. 09/985,805, filed on Nov. 6, 2001, now Pat. No. 7,019,801.

(30) Foreign Application Priority Data

Nov. 14, 2000 (JP) ............................. 2000-346279
Oct. 17, 2001 (JP) ............................. 2001-319778

(51) Int. Cl.
*G02F 1/1335* (2006.01)

(52) U.S. Cl. ........................................ 349/57; 349/113

(58) Field of Classification Search .................. 349/57, 349/61, 63, 113, 112; 359/592, 601, 840
See application file for complete search history.

(56) References Cited

U.S. PATENT DOCUMENTS

| 5,416,495 | A | 5/1995 | Davis et al. |
| 5,694,189 | A | 12/1997 | Nakamura et al. |
| 6,088,074 | A | 7/2000 | Suzuki |
| 6,091,469 | A | 7/2000 | Naito |
| 6,273,577 | B1 | 8/2001 | Goto et al. |
| 6,278,508 | B1 | 8/2001 | Ogawa et al. |
| 6,364,497 | B1 * | 4/2002 | Park et al. ............. 362/627 |
| 6,435,687 | B1 | 8/2002 | Fukiharu |
| 6,507,378 | B1 | 1/2003 | Yano et al. |

FOREIGN PATENT DOCUMENTS

| EP | 0 818 708 | 1/1998 |
| JP | 60-233624 A | 11/1985 |
| JP | 8-87009 A | 4/1996 |
| JP | 8-95035 A | 4/1996 |
| JP | 9-288271 A | 11/1997 |
| JP | 10-003813 | 1/1998 |
| JP | 10-253807 A | 9/1998 |
| JP | 10-301109 | 11/1998 |
| JP | 11-109344 | 4/1999 |
| JP | 11-110131 | 4/1999 |
| JP | 11-142833 | 5/1999 |

(Continued)

OTHER PUBLICATIONS

U.S. Appl. No. 09/985,805, filed Nov. 6, 2001.

(Continued)

*Primary Examiner*—Dung T. Nguyen
*Assistant Examiner*—Tai Duong
(74) *Attorney, Agent, or Firm*—Nixon & Vanderhye P.C.

(57) ABSTRACT

The reflective display device of the invention includes: a display layer; an optical element placed on an observer side of the display layer; and a reflection element placed on a side of the display layer opposite to the observer side. The optical element has a principal plane including a plurality of tilt faces tilted with respect to the display plane. Light incident on the display layer through the optical element and reflected by the reflection element is allowed to outgo in a direction roughly normal to the display plane.

5 Claims, 22 Drawing Sheets

FOREIGN PATENT DOCUMENTS

| | | |
|---|---|---|
| JP | 11-202782 | 7/1999 |
| WO | WO 94/24927 | 11/1994 |
| WO | 95/23996 A1 | 9/1995 |

OTHER PUBLICATIONS

Ting et al, "4.5.2: A High-Brightness High-Contrast Reflective LCD with a Micro Slant Reflector (MSR)", SID 99 Digest, pp. 954-957.

Taiwanese Office Action mailed Mar. 18, 2003 in corresponding TW application No. 2000-346279 and translation.

Notice of Reasons for Rejection mailed Aug. 21, 2003 in corresponding Korean application No. 10-2001-0070381 and English translation thereof.

Korean Notice of Reasons for Rejection and English translation thereof mailed Apr. 30, 2004 in corresponding Korean application No. 10-2001-0070381.

Chinese Office Action mailed Feb. 4, 2005 (w/English translation thereof).

"An Investigation on Voltage Dependence of the Refractive Index of Liquid Crystal"; Xiaoxiao et al., Laser Journal, vol. 20, No. 3, 1999 (1pg).

* cited by examiner $\phi < \arcsin(1/n1)$ $\phi > \arcsin(1/n1)$ $1.0 < n2 < n1$ $1.0 \leq n1 < n2$

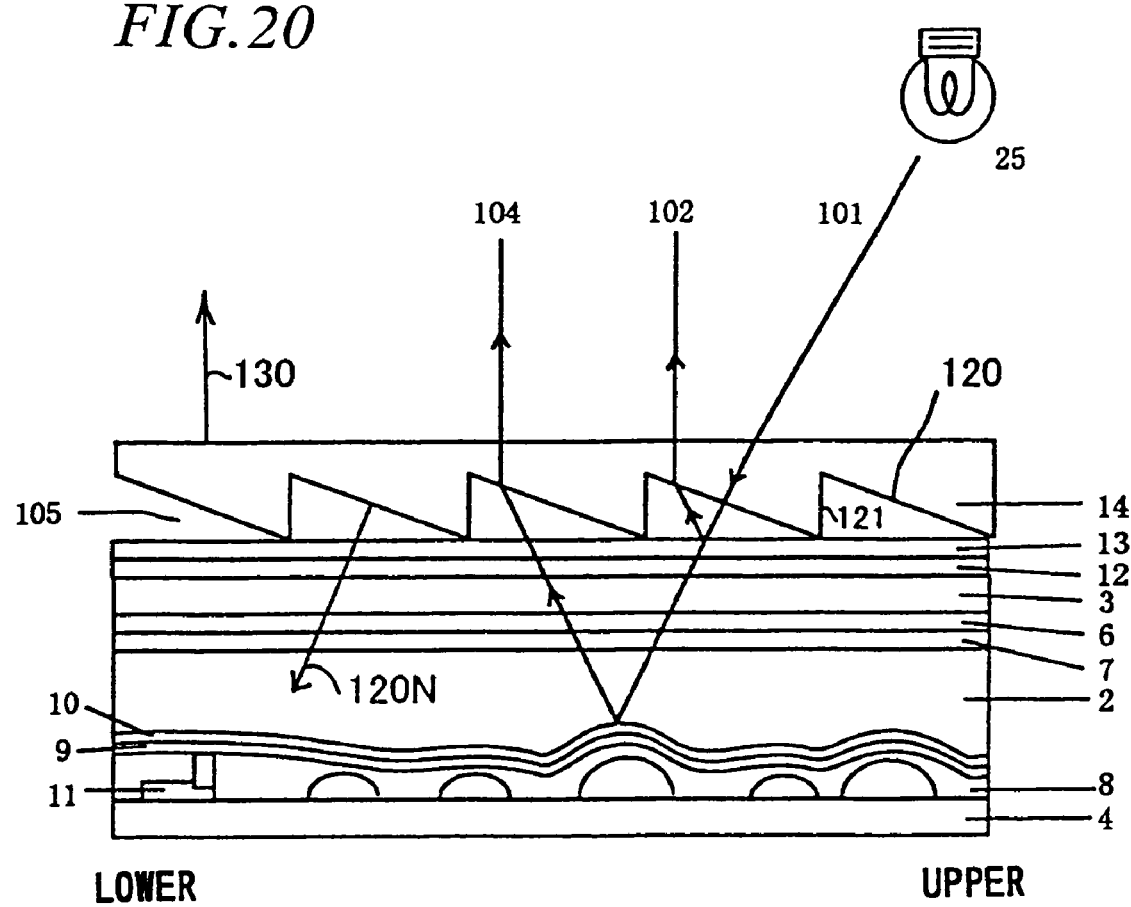

REFLECTIVE DISPLAY DEVICE AND PRISM ARRAY SHEET

This application is a Divisional of application Ser. No. 09/985,805, filed Nov. 6, 2001, U.S. Pat. No. 7,019,801 the entire content of which is hereby incorporated herein by reference in this application.

BACKGROUND OF THE INVENTION

The present invention relates to a direct-view type reflective display device that displays an image with reflected light and a prism array sheet used for the reflective display device.

Conventionally, as display devices for portable electronic equipment such as notebook personal computers (PCs), reflective display devices that display an image by reflecting external light have been commercialized. For example, a liquid crystal display device provided with a polarizing plate and a metal reflector having an uneven surface has been developed. This type of liquid crystal display device adopts a birefringence display mode where display is performed by controlling birefringence of a liquid crystal layer in an electric field, and thus only one polarizing plate is necessary.

However, the above display mode has the following problems. Light is largely absorbed by the polarizing plate, color filters, and the like. Moreover, the display is bright only when observed from the direction of the regular reflection of light incident from a light source, and thus sufficient lightness is not obtained when observed from a direction deviated from the direction of the regular reflection. Therefore, to attain good display, the observer must adjust the angle of the display device and the position at which he or she observes the display. In addition, since the direction of the regular reflection overlaps surface reflection, the display quality is low.

To solve the above problems, Japanese Laid-Open Patent Publication No. 9-288271, for example, discloses a reflective display device where the reflection surface of a reflector is tilted at a predetermined angle with respect to the display plane so that the direction of light reflected by the reflector does not overlap the direction of the regular reflection from the display plane.

As another example, SID '99 Digest, p. 954 attempts to provide bright display for the observer who observes the display from a given direction (hereinafter, the direction from which the observer views a display is referred to as the observer direction) by forming tilts on an uneven reflector.

However, the conventional reflective display devices disclosed in Japanese Laid-Open Patent Publication No. 9-288271 and SID '99 Digest, p. 954 have the following problems. In these conventional reflective display devices, the reflector needs to have a tilt face to provide both the reflection function and the off-axis function (function capable of enhancing the brightness when observed from a direction deviated from the direction of the regular reflection from the display plane). This means that a reflector having a large step must be formed immediately below an optical modulation layer, that is, a liquid crystal layer. The resultant liquid crystal layer therefore fails to have a uniform cell thickness.

The step of the reflector may be flattened after formation of the reflector. In this case, however, it is necessary to flatten the reflector with a transparent resin or the like and thereafter form a transparent electrode on the flattened surface. This complicates the fabrication process of the reflector.

FIG. 17 illustrates a conventional reflective display device 98 as described above. The reflective display device 98 includes: a liquid crystal layer 94; a retardation plate, a substrate, an alignment film, and the like (these elements are collectively denoted by the reference numeral 96) formed on the side of the liquid crystal layer 94 closer to the observer (observer side); and a reflector 91 on the side of the liquid crystal layer 94 opposite to the observer side. The reflector 91 has a plurality of tilt faces 92 on the surface thereof closer to the liquid crystal layer 94. A transparent resin 95 is formed on the tilt faces 92 to flatten the surface of the reflector 91.

In the reflective display device 98 having the above construction, in order to deviate the direction in which light outgoes from the display device 98 (indicated by arrow 99) by 30 degrees from the incident direction (indicated by arrow 93), for example, it is necessary to form the tilt faces 92 having a tilt angle of about 10 degrees on the reflector 91 as shown in FIG. 17. With such tilt faces 92 formed on the reflector 91, the distance between the liquid crystal layer 94 and the reflector 91 is large at certain positions of the tilt faces 92. At these positions, the distance between pixels (not shown) on the observer side and the reflector 91 is also large. This large distance between the pixels and the reflector 91 causes a problem of color mixture when color filters are formed on the substrate on the observer side.

In the reflective display device disclosed in Japanese Laid-Open Patent Publication No. 9-288271, where the reflector is produced separately from the display part and then placed on the outer back surface of the display part, a large gap is formed between the display part and the reflector. Due to this large gap, the parallax of the display becomes a serious problem. In addition, there are an increased amount of light rays that are incident on one pixel and outgo from another pixel. As a result, the lightness and color purity of the display decrease.

Japanese Laid-Open Patent Publication No. 8-95035 discloses a reflective display device where a prism array sheet is placed on the outer surface of a display device on the observer side to separate light for display reflected from the display device from the regular reflection of external light. However, this display device hardly provides display brightness when viewed at a position in front of the display device, at which the observer normally observes an image on the display, and substantially provides only dark display.

An object of the present invention is to provide a reflective display device capable of attaining display with high brightness for the observer present in front of the display device, and a prism array sheet used for the reflective display device.

SUMMARY OF THE INVENTION

The reflective display device of the present invention includes: a display layer; an optical element placed on an observer side of the display layer; and a reflection element placed on a side of the display layer opposite to the observer side. The optical element has a principal plane including a plurality of tilt faces tilted with respect to the display plane. A light ray incident on the display layer through the optical element and reflected by the reflection element is allowed to outgo in a direction roughly normal to the display plane.

Preferably, the principal plane of the optical element faces the observer side. Alternatively, the principal plane of the optical element faces a side of the reflection element.

The reflective display device may further include a scattering element for scattering light reflected by the reflection element, wherein the light ray incident on the display layer through the optical element and reflected by the reflection element is allowed to outgo in a direction roughly normal to the display plane by a combination of the optical element, the reflection element, and the scattering element.

Preferably, a light ray incident from a direction tilted toward the upper side of the display plane with respect to the direction normal to the display plane outgoes in a direction roughly normal to the display plane.

Preferably, the light ray is emitted from a first light source placed on the observer side of the optical element at a position tilted toward the upper side of the display plane with respect to the direction normal of the display plane.

Preferably, the angle of the plurality of tilt faces with respect to the display plane is set so that some of the light ray incident from a position tilted by an angle in a range of about 10 degrees to about 45 degrees with respect to the direction normal to the display plane outgoes in a direction roughly normal to the display plane.

Preferably, the plurality of tilt faces are tilted at a predetermined angle with respect to the display plane, and the predetermined angle is 7 degrees or more.

Preferably, the optical element has a plurality of other faces having an arbitrary angle with respect to the display plane, and the plurality of tilt faces and the plurality of other faces are formed alternately.

The plurality of other faces of the optical element preferably have an angle of about 90 degrees with respect to the display plane.

Preferably, a reflection layer is formed on each of the plurality of other faces of the optical element. Alternatively, an absorption layer may be formed on each of the plurality of other faces of the optical element.

The angle of the plurality of tilt faces with respect to the display plane preferably varies in the display plane.

The plurality of tilt faces are preferably curved.

The direction of a normal vector to one of the plurality of tilt faces is preferably different from the direction of a normal vector to one of the plurality of other faces.

Preferably, the optical element is a prism array sheet including a plurality of prisms in an array, and the pitch of the prisms is 200 µm or less.

Preferably, the optical element is a prism array sheet including a plurality of prisms in an array, and the pitch of the prisms is 5 µm or more and a half or less of a pixel pitch of the reflective display device.

Preferably, pixels of the reflective display device are arranged in at least a first direction, the optical element is a prism array sheet including a plurality of prisms arranged in at least a second direction, and the first direction and the second direction form an angle in a range of about 5 degrees to about 85 degrees.

An anti-reflection film is preferably formed on the optical element on the observer side.

The reflective display device may further include a second light source placed on a side of the optical element, and the optical element functions as a light guide element.

The optical element is preferably made of a material having a variable refractive index n1.

A polarizing plate is preferably placed on the optical element on the observer side via an air layer.

Preferably, a retardation plate is placed on the optical element on the observer side via an air layer, and a polarizing plate is placed on the retardation plate on the observer side.

The optical element is preferably made of an optically isotropic material.

Preferably, a base material is placed in contact with the optical element on the side of the reflection element, and the base material and the optical element have roughly the same refractive index.

The plurality of tilt faces of the optical element are preferably subjected to anti-glare treatment.

The plurality of other faces of the optical element are preferably rough faces.

Preferably, a polarizing plate and a retardation plate are placed on the optical element on the observer side, and the polarizing plate and the retardation plate substantially satisfy a quarter λ condition.

The prisms are preferably arranged at a random pitch in the display plane.

Preferably, an additional optical element is placed between the display layer and the optical element to separate display light from light reflected by at least one of interfaces formed by the optical element, the display layer and the reflection element.

The additional element preferably has a plurality of tilt faces tilted with respect to the display plane on the observer side.

Preferably, the refractive index of the optical element is greater than the refractive index of a medium located immediately above the plurality of tilt faces, and the direction normal to the plurality of tilt faces of the optical element is tilted toward the lower side of the display plane with respect to the direction normal to the display plane.

Preferably, the plurality of tilt faces of the optical element are in contact with the air, and the angle $\alpha$ of the plurality of tilt faces with respect to the display plane and the refractive index n1 of the optical element satisfy $$2\alpha - \arcsin(\sin\alpha/n1) < \arcsin(1/n1).$$

Preferably, when the outgoing angle $\theta_{out}$ of light incident from the direction normal to the display plane satisfies $$\theta_{out} = \arcsin[n1 \cdot \sin\{2\alpha - \arcsin(\sin\alpha/n1)\}] - \alpha,$$

the angle $\alpha$ of the plurality of tilt faces with respect to the display plane and the refractive index n1 of the optical element satisfy $$0° < \arcsin[n1 \cdot \sin\{2\alpha - \arcsin(\sin\alpha/n1)\}] - \alpha < (90 - \alpha)°.$$

A protection sheet is preferably formed on the plurality of tilt faces of the optical element.

The plurality of tilt faces of the optical element are preferably flattened with a transparent base material.

Preferably, the reflective display device further includes a pair of substrates sandwiching the display layer, wherein the optical element is placed between one of the pair of substrates and the display layer.

Preferably, the plurality of tilt faces of the optical element are flattened with a transparent base material, and when the refractive index n1 of the optical element, the refractive index n2 of the transparent base material, and the refractive index (1.0) of the air in contact with the transparent base material have a relationship of n1>n2>1, the tilt angle $\alpha$ of the plurality of tilt faces of the optical element satisfies both $$2\alpha - \arcsin(\sin\alpha \cdot n2/n1) < \arcsin(n2/n1) \text{ and}$$

$$\arcsin[(n1/n2) \cdot \sin\{2\alpha - \arcsin((n2/n1) \cdot \sin\alpha)\}] - \alpha < \arcsin(1/n2).$$

Preferably, the refractive index of the optical element is smaller than the refractive index of a medium located immediately above the plurality of tilt faces, and the direction normal to the tilt faces of the optical element is tilted toward the upper side of the display plane with respect to the direction normal to the display plane.

Preferably, the plurality of tilt faces of the optical element are flattened with a transparent base material, and when the refractive index n1 of the optical element, the refractive index n2 of the transparent base material, and the refractive index (1.0) of the air in contact with the transparent base material have a relationship of $1 \leq n1 < n2$, the tilt angle $\alpha$ of the plurality of tilt faces of the optical element satisfies both $\alpha < \arcsin(n1/n2)$ and $\alpha - \arcsin[(n1/n2) \cdot \sin\{2\alpha - \arcsin((n2/n1) \cdot \sin\alpha)\}]$
$< \arcsin(1/n2)$.

Preferably, the optical element has a back surface opposite to the principal plane and in parallel with the display plane, and a protection plate is placed on the back surface.

According to another aspect of the invention, a prism array sheet used for a reflective display device is provided. The prism array sheet is placed on the reflective display device on an observer side, a plurality of tilt faces tilted with respect to a display plane of the reflective display device are formed on the observer side, the plurality of tilt faces being in contact with the air, and the angle $\alpha$ of the plurality of tilt faces with respect to the display plane and the refractive index n1 of the prism array sheet satisfy $2\alpha - \arcsin(\sin\alpha/n1) < \arcsin(1/n1)$.

The angle $\alpha$ of the plurality of tilt faces is preferably 7 degrees or more.

Preferably, the angle of the plurality of tilt faces is set so that some of the light ray incident from a position tilted by an angle in a range of about 10 degrees to about 45 degrees with respect to the direction normal to the display plane outgoes in a direction normal to the display plane.

Preferably, the outgoing angle $\theta_{out}$ of a principal ray of light incident on the reflective display device from the direction normal to the display plane satisfies $\theta_{out} = \arcsin[n1 \cdot \sin\{2\alpha - \arcsin(\sin\alpha/n1)\}] - \alpha$ and $0° < \theta_{out} < (90 - \alpha)°$.

The prism array sheet is preferably made of an optically isotropic material.

BRIEF DESCRIPTION OF THE DRAWINGS

FIG. 9A is an enlarged perspective view of prisms a, b, and c and FIG. 9B is a view combining a plane view and side views of the prism array sheet.

FIG. 20 is a schematic cross-sectional view of a reflective display device as a comparative example.

DETAILED DESCRIPTION OF THE INVENTION

Hereinafter, preferred embodiments of the present invention will be described with reference to the accompanying drawings.

Embodiment 1

Figure 1A:
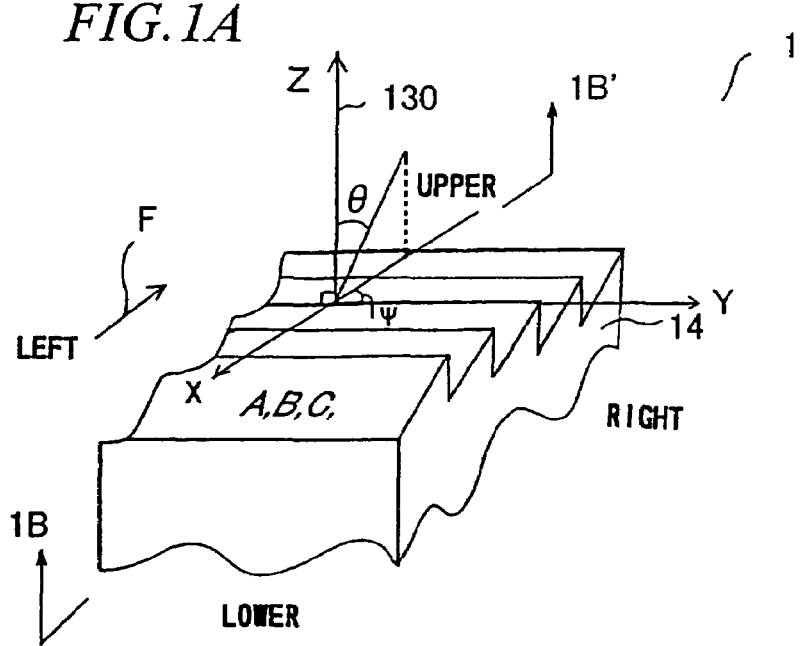
FIG. 1A is a schematic perspective view of a reflective liquid crystal display device 1 of Embodiment 1 of the present invention including a prism array sheet 14.
Figure 1B:
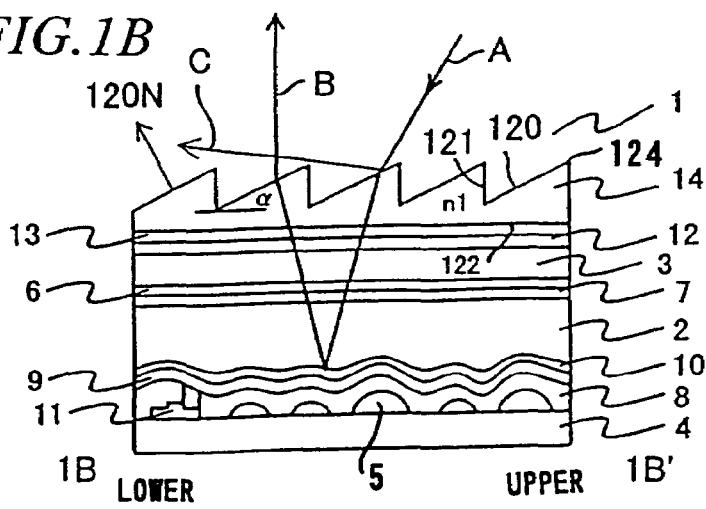
FIG. 1B is a cross-sectional view taken along line 1B–1B' of FIG. 1A.

FIG. 1A is a partial perspective view schematically illustrating a reflective liquid crystal display device 1 of Embodiment 1 of the present invention. FIG. 1B is a cross-sectional view of the reflective liquid crystal display device 1 of FIG. 1A taken along line 1B–1B'. As shown in FIG. 1A, an X-Y-Z coordinate system is defined for the reflective liquid crystal display device 1 positioned so that a displayed image (for example, alphabets A, B, C) is correctly observed. Typically, the X-axis direction represents the direction of columns of pixels arranged in a matrix, the Y-axis direction represents the direction of rows of pixels, and the Z-axis direction represents a direction 130 normal to a display plane. Herein, the sides of the display plane corresponding to 12 o'clock and 6 o'clock when the display plane is assumed as a clock dial are called "upper" and "lower" sides, respectively, and the sides corresponding to 3 o'clock and 9 o'clock are called "right" and "left" sides, respectively. The X-Y plane is defined in the display plane, where the X axis extends in the "vertical" direction and the Y axis extends in the "lateral" direction. The display plane as used herein refers to a plane parallel to two substrates 3 and 4 (see FIG. 1B) of the display device 1. The observer observes the display device 1 at a position on the side of the display device 1 opposite to a reflective electrode 9 with respect to a display layer 2 (see FIG. 1B). For observation, illuminating light from an illuminator located at an arbitrary position outside the display device 1 is used. The illuminator may be sun or a lighting on a ceiling, or a specific light source integrated with the display device 1. As used herein, the "observer-side surface of a prism array sheet 14", for example, refers to the principal plane of the prism array sheet 14 having a plurality tilt faces 120.

Hereinafter, the reflective liquid crystal display device 1 will be described with reference to FIGS. 1A and 1B.

In Embodiment 1, described is the case that the tilt faces of the prism array sheet are in contact with the air, that is, an interface is formed between the prism array sheet and the air. The reflective liquid crystal display device 1 includes the prism array sheet 14 placed on the front surface (observer-side surface) of a reflective liquid crystal display device of the type using a single polarizing plate. As shown in FIG. 1B, the liquid crystal layer 2 is sandwiched by the pair of substrates 3 and 4. A transparent electrode 6 and an alignment film 7 are formed on the surface of the observer-side substrate 3 closer to the liquid crystal layer 2. A resin layer 8, a reflective pixel electrode 9, and an alignment film 10, all in an uneven shape, are formed on the surface of the counter substrate 4 closer to the liquid crystal layer 2. The liquid crystal layer 2 includes a nematic liquid crystal material having positive dielectric anisotropy sealed therein, which is aligned, while being twisted, according to the aligned direction of the alignment film 7. Active (switching) elements 11 such as TFTs and MIMs are formed in a matrix below the resin layer 8 for switching every pixel.

When a voltage is applied across the display device 1, which has the electrodes 6 and 9 formed on the surfaces of the substrates 3 and 4 closer to the liquid crystal layer 2, an electric field is generated vertically to the substrates 3 and 4. This causes change in the orientation state of liquid crystal molecules and thus enables switching. In this embodiment, the cell thickness between the upper and lower substrates was 4.5 µm. The uneven-shaped reflective pixel electrode 9 serving as a reflecting/scattering element was formed to have an "isotropically scattering" characteristic that "scatters" light in directions neighboring the direction of the regular reflection as the center. Specifically, a plurality of convex portions 5 made of a resin or the like were formed on the surface of the substrate 4, and then a film made of Al was applied to the surface having the convex portions, to thereby provide the reflective pixel electrode 9 in an uneven shape.

An appropriate retardation plate (or film) 12 and polarizing plate 13, and the prism array sheet 14 are placed on the observer-side surface of the observer-side substrate 3 in this order at an appropriate angle. The prism array sheet 14 has faces tilted with respect to the display plane on the observer-side surface thereof. The prism array sheet 14 is made of a transparent base material having a refractive index different from that of an adjacent layer in contact with the prism array sheet 14 (an air layer in this embodiment). The refractive index therefore changes at the interface between the prism array sheet 14 and the adjacent layer in contact therewith.

Any of TN, STN, and ECB may be adopted as the display mode of the display device 1. The retardation plate 12, the polarizing plate 13, and the prism array sheet 14 may be bonded to the observer-side surface of the substrate 3 with an appropriate adhesive. In addition, when the observer-side surface (having a plurality of the tilt faces 120) of the prism array sheet 14 contacts with the air as shown in FIGS. 1A and 1B, at least the tilt faces 120 are preferably subjected to anti-reflection (AR) treatment or anti-glare (AG) treatment. By such treatment, occurrences of reflection of an image in the display and surface reflection can be reduced, and thus high-quality display can be obtained. The AR or AG treatment of the observer-side surface of the prism array sheet 14 is practically realized by forming a desired film on the observer-side surface of the prism array sheet 14.

As shown in FIGS. 1A and 1B, by the existence of the prism array sheet 14 at the observer-side surface of the display device 1, a principal ray of incident light (indicated by arrow A in FIG. 1B) in the display device 1 is allowed to outgo in a direction (indicated by arrow B, which is close to the normal to the display plane) different from the direction of the regular reflection (shown by arrow C). Therefore, display light and regular-reflected light of a principal ray incident from an external illuminator are prevented from simultaneously entering the observer's eyes, and thus the display quality improves.

The basic construction of the display device 1 of Embodiment 1 is similar to that of the conventional reflective liquid crystal display device of the type using a single polarizing plate, except that the prism array sheet 14 is provided. Therefore, the display operation is similar to that of the conventional display device having no prism array sheet.

The prism array sheet 14 at the front surface (observer-side surface) of the display device 1 is constructed of a plurality of prisms arranged in a stripe shape. The surface of the prism array sheet 14 is composed of alternate repetition of faces tilted by a predetermined angle α with respect to the display plane (tilt faces 120) and the other faces (denoted by 121) of which the tilt angle is not specifically defined, to form a "sawtooth" section. A direction 120N normal to any of the tilt faces 120 is tilted toward the lower side of the display plane with respect to the direction 130 normal to the display plane. The shape of the prism array sheet usable in this embodiment is not limited to that described above, but prism array sheets in various shapes can be used.

Figure 1C:
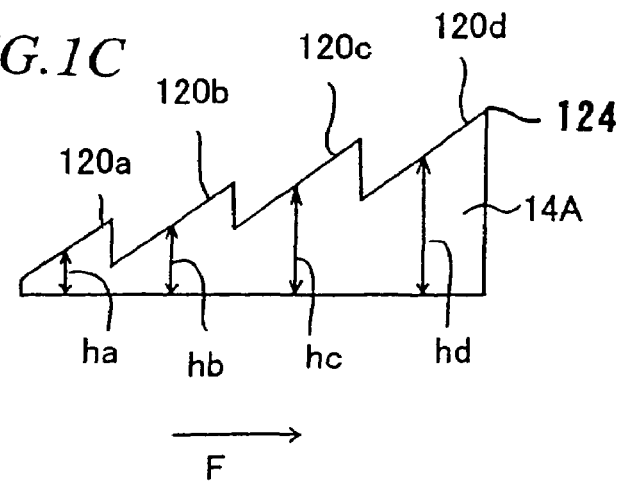
FIG. 1C is a cross-sectional view of a modified prism array sheet 14A applicable in the present invention.

An example of the prism array sheets usable in this embodiment will be described with reference to FIG. 1C. FIG. 1C is a cross-sectional view of a modified prism array sheet 14A usable in this embodiment, taken in the direction of the array of the prisms. The prism array sheet 14A has a plurality of tilt faces 120*a*, 120*b*, 120*c*, and 120*d*. The heights ha, hb, hc, and hd of the tilt faces 120*a*, 120*b*, 120*c*, and 120*d* at the geometric center of gravity shown in FIG. 1C gradually increase in the direction of the array of prisms (ha<hb<hc<hd). By using the prism array sheet 14A in the shape of a rough wedge as a whole, also, the principal ray of light incident on the display device 1 is allowed to outgo in a direction different from regular-reflected light from the front surface of the display device 1. In this way, the reflected principal ray can be separated from regular-reflected light of an external illuminator. The "direction of the array of prisms of the prism array sheet" as used herein refers to the direction vertical to a plurality of ridges 124 on the surface of the prism array sheet 14, and 14A, shown by arrow F in FIGS. 1A and 1C.

The brightness of display as observed by the observer can be properly improved by appropriately setting the tilt angle α of the tilt faces 120, the refractive index n1 of the prism base material, the direction of the array of prisms, and the like of the prism array sheet 14. However, in the setting of the tilt angle α of the tilt faces 120 and the refractive index n1 of the prism base material, it should be noted that the prism array sheet 14 must have a shape that allows "a light ray incident from an illuminator (main light source) to outgo in a direction toward the position of the observer (observer direction). To state inversely, "a light ray incident from the observer direction on the observer side must be allowed to outgo back to the observer side without being totally reflected when it outgoes from the prism array sheet".

The above condition will be examined using the case that the tilt faces of the prism array sheet 14 are exposed outside (in contact with the air). Specifically, assuming that the observer direction is the direction normal to the display device, the path of a light ray outgoing in the observer direction is traced retrospectively. That is, a light ray is introduced into the display device from the observer direction (normal to the display device), and whether or not the incident light ray is allowed to outgo back from the display device is examined.

Figure 2A:
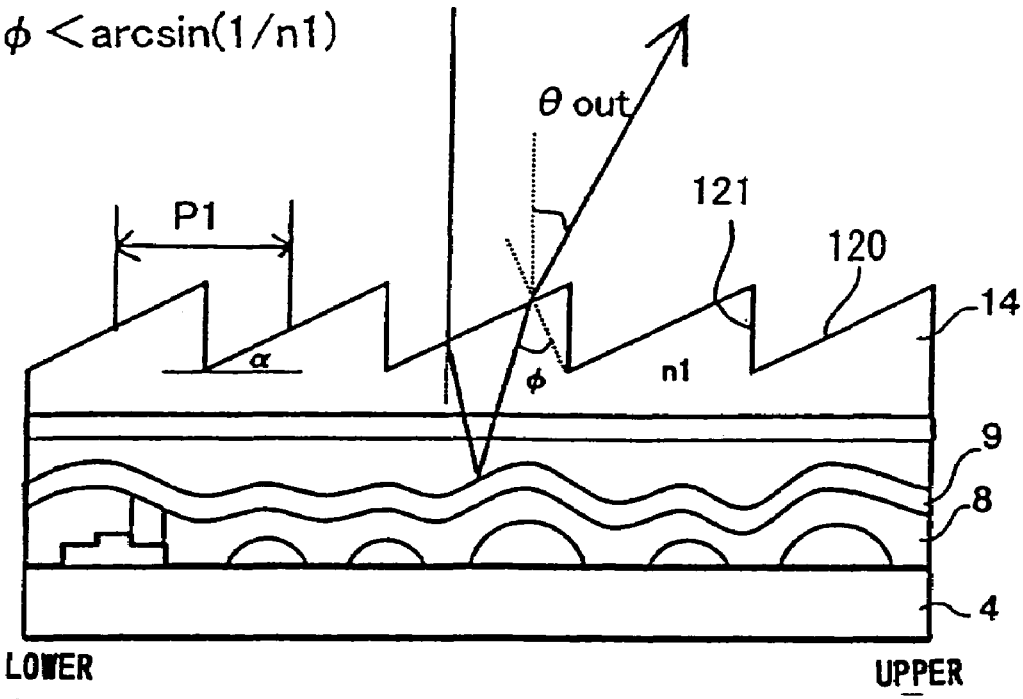
FIGS. 2A and 2B are views showing a proper condition (2A) and an improper condition (2B) for tilt faces of the prism array sheet used for the display device of the embodiment of the present invention.
Figure 2B:
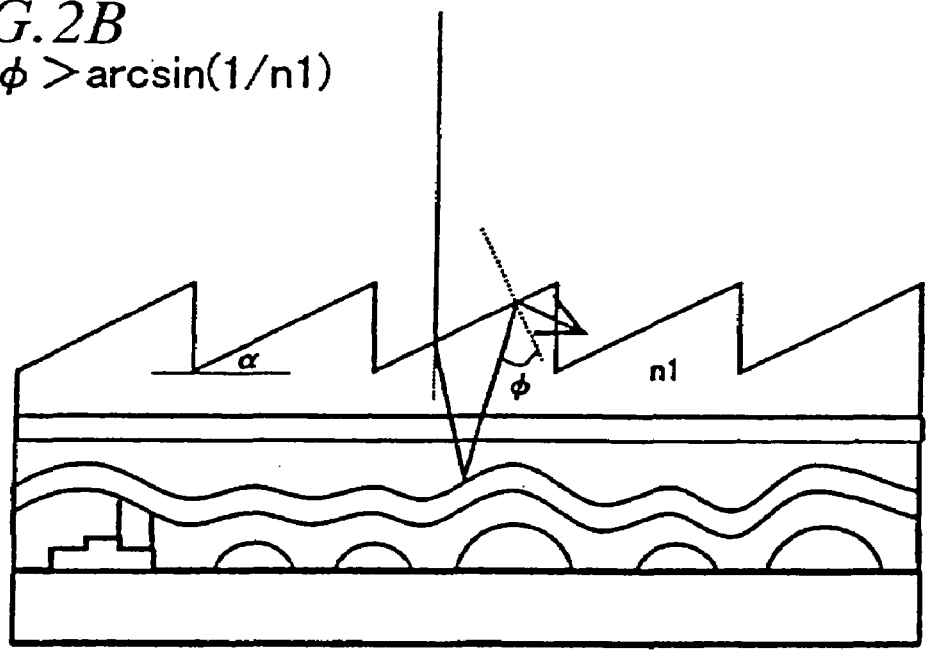
Figure 3:
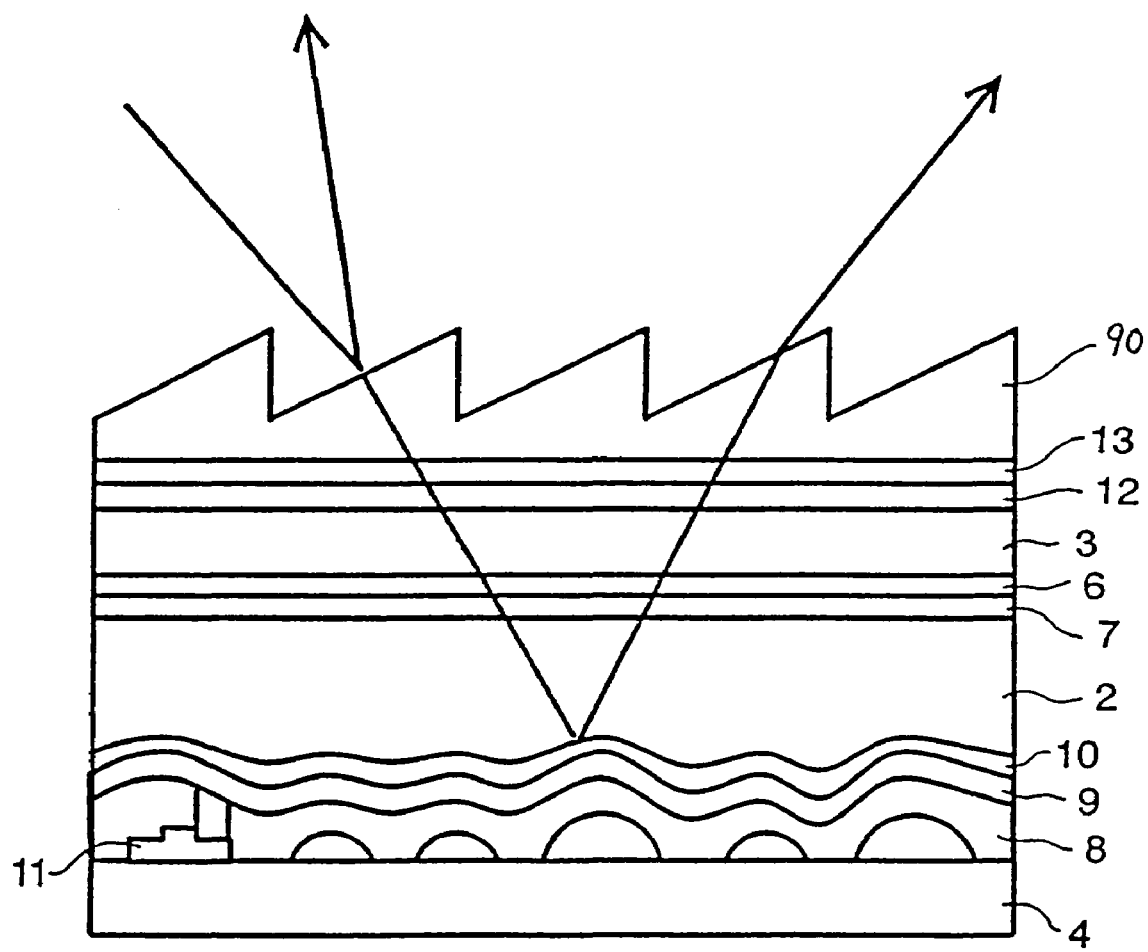
FIG. 3 is a view showing the positional relationship between an incident principal ray and a regular reflection ray observed when a light source is located at a position normal to the tilt faces of the prism array sheet 14.

Light incident from the direction normal to the display device enters the display device 1 after being refracted by a tilt face of the prism array sheet 14 as the front surface of the display device 1. The angle of this refraction is determined by the tilt angle α and the refractive index n1 of the prism array sheet 14. The incident light is scattered/reflected by the reflective pixel electrode 9 in the display device 1. The principal ray of the light is reflected in the regular reflection direction and reaches a tilt face of the prism array sheet 14 again. At this time, if the angle φ at which the principal ray reaches the tilt face of the prism array sheet 14 is smaller than a total reflection angle arc sin(1/n1) at the interface with the air, the principal ray is allowed to outgo back to the observer side as shown in FIG. 2A. Since expression $$\phi = 2\alpha - \arcsin(\sin \alpha / n1) \quad (1)$$

is derived from the Snell's Law, $$2\alpha - \arcsin(\sin \alpha / n1) < \arcsin(1/n1) \quad (2)$$

is the condition that the shape and the refractive index of the base material of the prism array sheet must satisfy to ensure a light ray incident from the observer direction (normal to the display device) to outgo back to the observer side. If the angle φ at which a principal ray reflected from the reflection surface reaches a prism is greater than the total reflection angle, the principal ray is totally reflected at the interface of the prism as shown in FIG. 2B, failing to return to the observer side. This darkens the display.

Therefore, the angle α of the tilt faces with respect to the display plane and the refractive index n1 of the prism array sheet 14 must satisfy expression (2) above when the medium existing immediately above the prism array sheet 14 is the air and the reflective pixel electrode 9 reflects light in directions neighboring the direction of the regular reflection as the center.

To attain display with high brightness in a reflective display device, the outgoing angle of the principal ray described above play an important role. As described earlier, the condition that "a light ray incident from a main illuminator is allowed to outgo in the observer direction" inversely means that "a light ray incident from the observer direction (normal to the display device) is allowed to outgo back to the observer side without being totally reflected when it outgoes from the prism array sheet". Therefore, it is desirable to design the prism array sheet so that the principal ray of illuminating light incident from the direction normal to the display device outgoes mainly to the observer side.

In a reflective display device, the brightness of display largely depends on the position of an illuminator and the distribution thereof in the observation environment. Therefore, by setting the display device so that light is admitted from the direction in which an illuminator may exist with high probability, display with high brightness will be attained with high probability. The angle at which an external illuminator faces to a display panel largely depends on the use of the panel and the angle at which the panel is tilted when used. It is therefore preferable to determine the tilt angle and refractive index of the prisms depending on the use, and design properly so that light outgoes to the direction in which a main illuminator may exist with high probability.

Moreover, as is found from FIG. 2A, when the prism array sheet 14 is placed to be in contact with the air, the principal ray incident from the observer direction (normal to the display device) outgoes from the display device in a direction which is different from the direction 120N normal to the tilt faces (direction tilted toward the lower side of the display plane with respect to the direction 130 normal to the display plane). If the light path is traced retrospectively, this indicates that in order to allow the principal ray to outgo in the direction normal to the display device, the prism array sheet 14 should be placed so that the principal ray is incident from a direction which is different from the direction 120N normal to the tilt faces with respect to the normal to the display plane. If the principal ray is incident from the direction 120N normal to the tilt faces, the principal ray outgoes in a direction at an angle wider than the direction of the regular reflection, failing to outgo in the observer direction (normal to the display device). To state more specifically, when the observer views the display at a position normal to the display plane, in an environment that light is incident on the display device from a direction tilted toward the upper side of the display plane with respect to the direction 130 normal to the display plane (see FIG. 1A, 0<Ψ<180°, 0<θ<90°), the prism array sheet 14 should be placed so that the direction 120N normal to the tilt faces 120 is tilted toward the lower side of the display plane with respect to the normal to the display plane (180°<Ψ<360°, 0<θ<90°). On the contrary, when the observer views the display at a position normal to the display plane, in an environment that light is incident on the display device from a direction tilted toward the lower side of the display plane with respect to the direction 130 normal to the display plane, the prism array sheet 14 should be placed so that the direction 120N normal to the tilt faces 120 is tilted toward the upper side of the display plane with respect to the normal to the display plane.

The reflective display device disclosed in Japanese Laid-Open Patent Publication No. 8-95035 described above has a precondition that a light source is placed at a position close to the normal to the tilt faces of the prism array sheet 90. Therefore, the principal ray outgoes in a direction greatly deviated from the direction normal to the display plane, and thus display brightness is not sufficient in front of the display device. On the contrary, in this embodiment, as shown in FIG. 1B, a major ray of light incident on the display panel enters a prism at an angle sufficiently tilted from the direction 120N normal to the tilt faces (direction indicated by arrow A), and the principal ray outgoes in a direction roughly normal to the display device (direction indicated by arrow B). This improves the display brightness in front of the display device.

As described earlier, in a reflective display device using reflection of external light for display, the angle at which an illuminator exists with respect to the display device is different depending on the use of the display device, and it is presumed that there may be an angle range in which a light source exists with high probability. Therefore, by appropriately setting the angle at which light is incident on the prism array sheet placed on the display device depending on the use of the display device, and designing so that the light incident at this angle is properly reflected in the observer direction, high-quality display with high brightness can be provided for the observer. Since reflective display devices have features of being thin and lightweight and usable with a battery for a prolonged period of time, they are often used as monitors of portable equipment such as notebook PCs and information terminals. In consideration of this, in order to ensure display with high brightness, it is first necessary to examine the angle at which such equipment is used and the illumination environment during the use of such equipment.

Figure 4A:
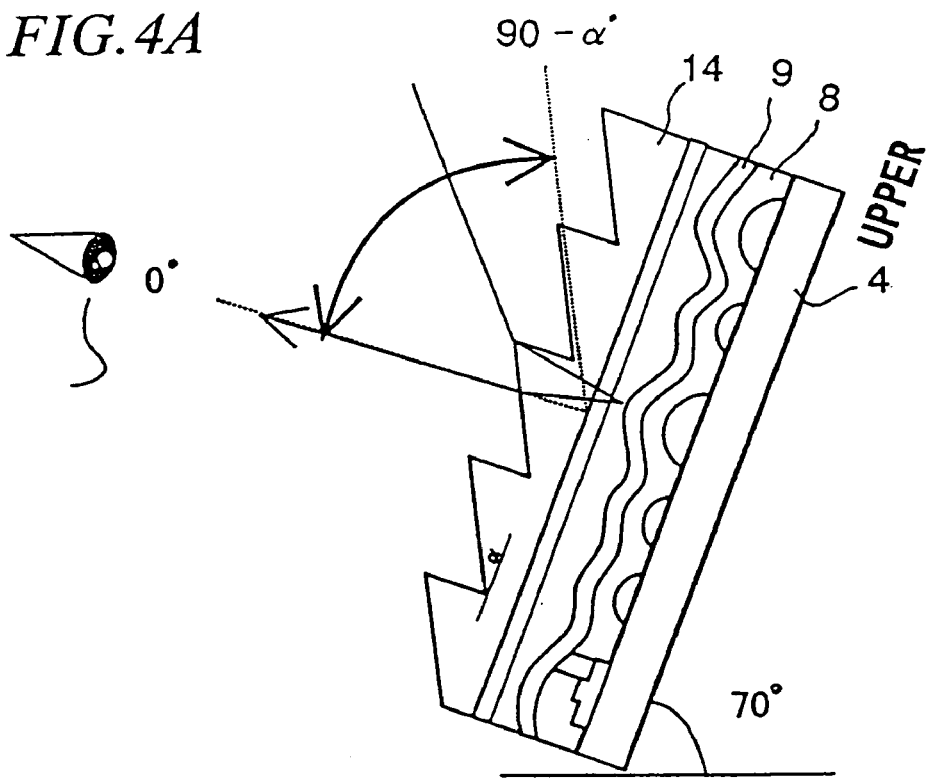
FIGS. 4A and 4B are schematic illustrations of use of the reflective display device of the present invention as a monitor of a notebook PC (4A) and as a display panel of an information portable terminal (4B).

For example, in the case of a monitor of a notebook PC, the user generally tilts the monitor to a comparatively large angle (about 70 degrees from the horizontal plane) as shown in FIG. 4A. It is therefore presumed with high probability that external light may be incident on the monitor from a direction tilted toward the upper side of the display plane with respect to the normal to the display plane by an angle of 0 to 90 degrees, where the light is not blocked by the observer. In consideration of the tilt angle α of the prisms, it is concluded that for the use for a notebook PC, the tilt angle α and the refractive index of the prism array sheet should be designed so that the outgoing angle $\theta_{out}$ of the principal ray of light incident from the observer direction (normal to the display device) falls in the range of 0 to (90−α) degrees ($\theta_{out}$=arc sin [n1·sin {2α−arc sin(sin α/n1)}]−α).

Figure 4B:
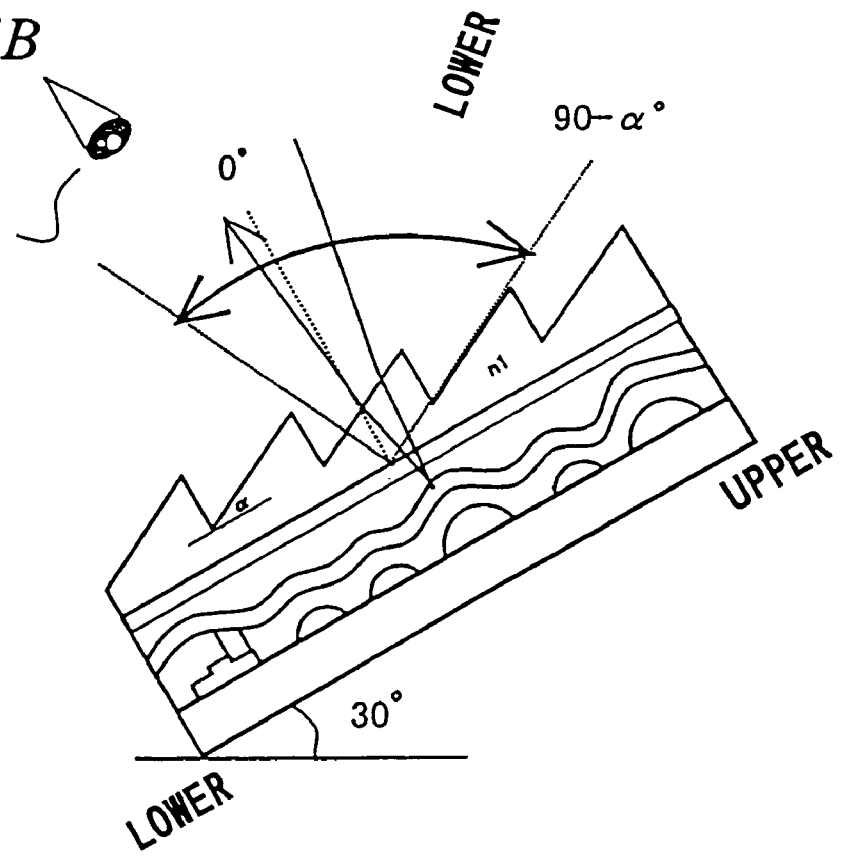

In the case of a monitor of equipment normally tilted to a comparatively small angle (about 30 degrees from the horizontal plane) such as an information portable terminal as shown in FIG. 4B, it is presumed with high probability that external light may be incident on the display device at an angle smaller than the case of a notebook PC. Therefore, the prism array sheet may be designed so that the outgoing angle $\theta_{out}$ is a little smaller than the case of a notebook PC. The illumination environment varies depending on the use environment of the display panel. In the case of a reflective display device equipped with no special illumination device, however, an illuminator is generally located at an upper position, such as in the sky and on a ceiling. Moreover, external light is not likely to be incident from directions deviated toward the lower side of the display plane with respect to the normal to the display panel, where the light is blocked by the observer. In view of these facts, it is appropriate to conclude that the light source may exist at a position deviated toward the upper side of the display plane with respect to the normal to the display panel. In other words, under the normal conditions, the outgoing angle $\theta_{out}$ of the principal ray of light incident from the observer direction (normal to the display device) is desirably tilted a little to an angle in the range of the upper quarter-sphere (0<Ψ<180°, 0<θ<90°) opposite to the position at which the observer observes the display device (lower quarter-sphere, 180°<Ψ<360°, 0<θ<90°). In consideration of the tilt angle α of the prism array sheet, the outgoing angle may be 0<$\theta_{out}$< (90−α).

By designing the direction and angle of the tilt faces and the refractive index of the prism array sheet under the above conditions, it is possible to attain display with high brightness in the actual panel use environment.

The present inventors examined a preferable range of the outgoing angle of light incident from the direction normal to the display device considering various uses of the display device. As a result, in the case of the use for notebook PCs, it was found that display with high brightness was possible when the outgoing angle was in the range of about 15 to about 45 degrees. In the case of equipment such as portable information terminals in which the tilt angle of the display plane with respect to the horizontal plane is comparatively small, external light is incident on the display device at a lower angle compared with the case of notebook PCs. In this case, therefore, assuming that light is incident from the direction normal to the display device, the outgoing angle may be smaller than the case of notebook PCs. According to the examination by the inventors, it was found that display with high brightness was possible when the outgoing angle was 10 degrees or more.

As described above, assuming that light is incident from the direction normal to the display device, the outgoing angle may be 10 degrees or more. This outgoing angle can be realized by using the prism array sheet 14 having a tilt angle α of 7 degrees or more with respect to the display plane when the prism array sheet 14 has a practical refractive index (1.3 to 1.7) and is in contact with the air.

A panel was actually mounted at a tilted position in a plurality of environments considering practical panel use conditions, and the brightness in front of the panel was measured and compared between the case of placing a prism array sheet on the panel surface and the case of placing no prism array sheet, as shown in Table 1 below. As a result, the case of placing a prism array sheet exhibited a value higher than the case of placing no prism array sheet by 1.2 to 1.9 times. Thus, the effect of the present invention was confirmed.

TABLE 1

| Measurement Environment | Indoors A (conference room) | Indoors B (near window) | Inside car | Outdoors (fine weather) |
|---|---|---|---|---|
| Degree of Brightness Improvement (over prior art) | 1.5 | 1.3 | 1.9 | 1.2 |

The display device described in this embodiment was designed so that light incident on the display device from a main light source outgoes in the observer direction, in consideration of the tilt angle of the display device when used and the illumination environment surrounding the display device, only using the function of the prism array sheet. However, the position and distribution of external illumination (light source) are very complicate and vary depending on the location at which the display device is used and the illumination environment surrounding the location. When the scattering/reflecting element (reflective pixel element 9) having an isotropic scattering characteristic that "scatters" light in directions neighboring the direction of the regular reflection as the center is used, as in Embodiment 1, the display brightness for the observer may improve compared with the conventional case by adjusting the direction and angle of the tilt faces and the refractive index of the prism array sheet. However, by only this adjustment, it is not possible to realize a more idealistic distribution of angles at which the display device captures illumination. In order to realize a more complicate illumination-capturing angle distribution and optimize this distribution to provide display with high lightness in a variety of use environments, it is necessary to take some measures such as providing anisotropy to the scatting/reflecting characteristics of a scattering element and a reflection element and adjusting the gain. Moreover, it is desirable to design so that light incident on the display device from a main light source outgoes in the observer direction that is different from the direction of the regular reflection, by combining the prism array sheet with the reflection element and the scattering element, that is, by exerting the overall function of the prism array sheet, the reflection element, and the scattering element.

The prism array sheet 14 used in Embodiment 1 has a sawtooth shape formed by alternately repeating tilt faces tilted at a predetermined angle $\alpha$ and the other faces of which the tilt angle is not specified. The prism array sheet of this shape can be produced by embossing an acrylic resin (n1=1.492) as a base material. As the base material, materials other than the acrylic resin, such as PEN (n1=1.66) manufactured by Teijin Ltd., ARTON F (n1=1.51) manufactured by JSR Corp., and an UV-curable resin having an arbitrary refractive index, may be used. Materials good in transparency, moldability, and mechanical strength may also be used, including materials other than plastics, such as glass and magnesium fluoride. It should however be noted that by placing a prism array sheet, reflection occurs at the interface of the prism array sheet. To prevent this interface reflection, therefore, the refractive index of the prism array sheet should desirably match with that of a polarizing plate and a glass substrate on which the prism array sheet is placed.

The surface of the prism array sheet 14 is bare, not being flattened with a resin or the like. That is, the tilt faces of the prism array sheet 14 are in contact with the air (n=1.0). In this embodiment, the pitch P1 of the prisms was 65 μm, and the tilt faces 120 was flat with a tilt angle $\alpha$ of 25 degrees. The pitch P1 of the plurality of prisms arranged in a stripe shape refers to the distance between the geometric centers of gravity of the adjacent tilt faces 120 as shown in FIG. 2A, which corresponds to the width of one prism. The other faces 121 are formed to stand vertical to the display plane. Having this shape of the prism array sheet, the principal ray of light incident from the direction normal to the display plane reaches one of the prism tilt faces 120 at an angle $\phi$ of 33.5 degrees, and outgoes from the panel at an outgoing angle $\theta_{out}$ of 30.5 degrees after being refracted at the interface between the air and the prism. Thus, in this embodiment, the angle $\phi$ at which light incident from the direction normal to the display plane reaches the prism interface again is sufficiently smaller than the total reflection angle of 42.1 degrees, and the outgoing angle $\theta_{out}$ is $0<\theta_{out}<75$ degrees. In this embodiment, an adhesive layer having the refractive index which matches with that of the prism array sheet 14 is formed on the back surface (surface opposite to the sawtooth-shaped surface) of the prism array sheet 14, and the prism array sheet 14 is bonded to the polarizing plate via the adhesive layer.

Figure 5:
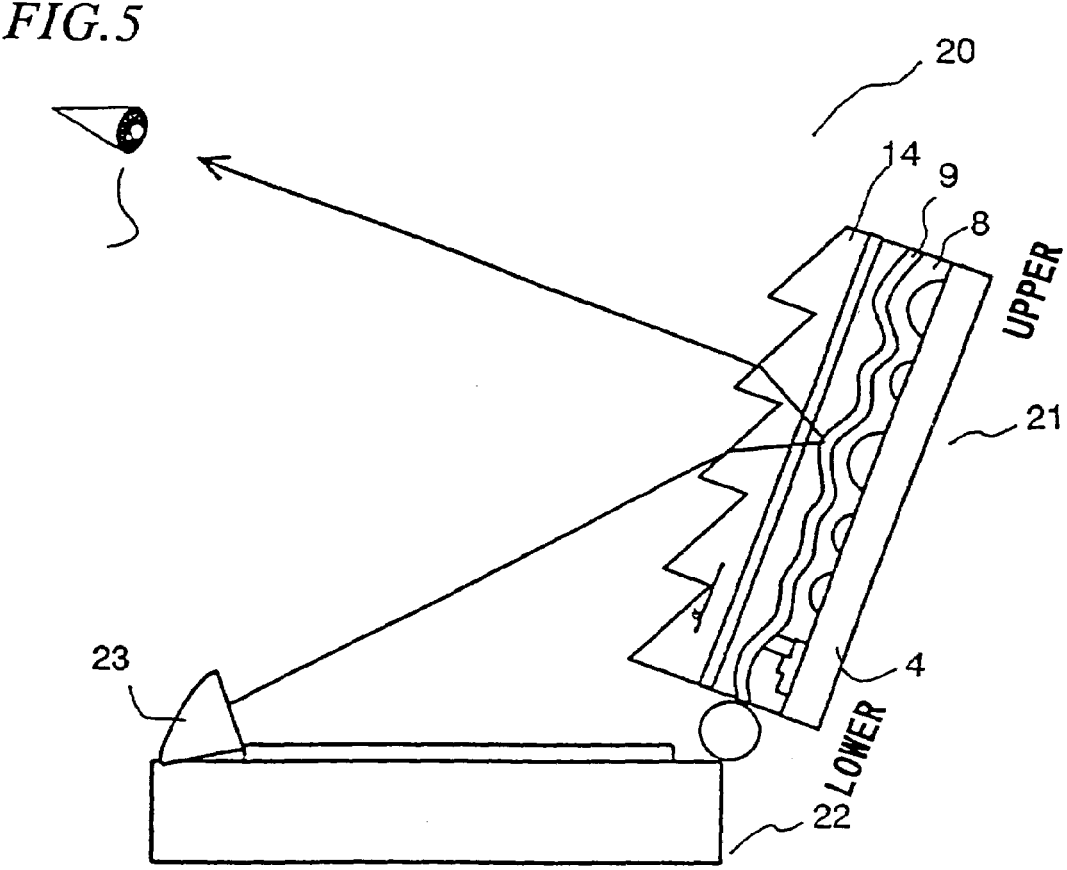
FIG. 5 is a view showing how display is done using light from an illuminator placed outside the display device in Embodiment 1 of the present invention.

In the embodiment described above, assuming the case of observing a display panel by use of only external illumination in an actual environment, a light source was determined to be located at an angle tilted toward the upper side of the display plane with respect to the normal to the display plane, that is, at a position opposite to the position of the observer with respect to the normal to the display plane. However, this is not applied to a reflective display device provided with an illuminator in advance in association with the panel. For example, FIG. 5 shows an information unit 20, such as an open/close type notebook PC, integrated with a specific light source 23 at an input part 22 located below a display part 21 for illuminating the display panel. In this case, the prism array sheet 14 having a tilt angle $\alpha$ is preferably placed so that the direction 120N normal to the tilt faces 120 is tilted toward the upper side of the display plane with respect to the direction 130 normal to the display plane. By this setting, a larger amount of light incident from the direction tilted toward the lower side of the display plane with respect to the normal to the display plane is allowed to outgo in the observer direction, and thus the brightness further improves.

The angle of the other faces 121 that are not defined by the tilt angle $\alpha$ of the prism array sheet 14 is not specifically restricted. However, as described above, the angle is desirably roughly vertical to the display plane. The reasons are for minimizing the area of these faces viewed by the observer when he or she observes the display and for reducing the area of these faces facing to a light source is viewed, to minimize loss of light in display.

Figure 6:
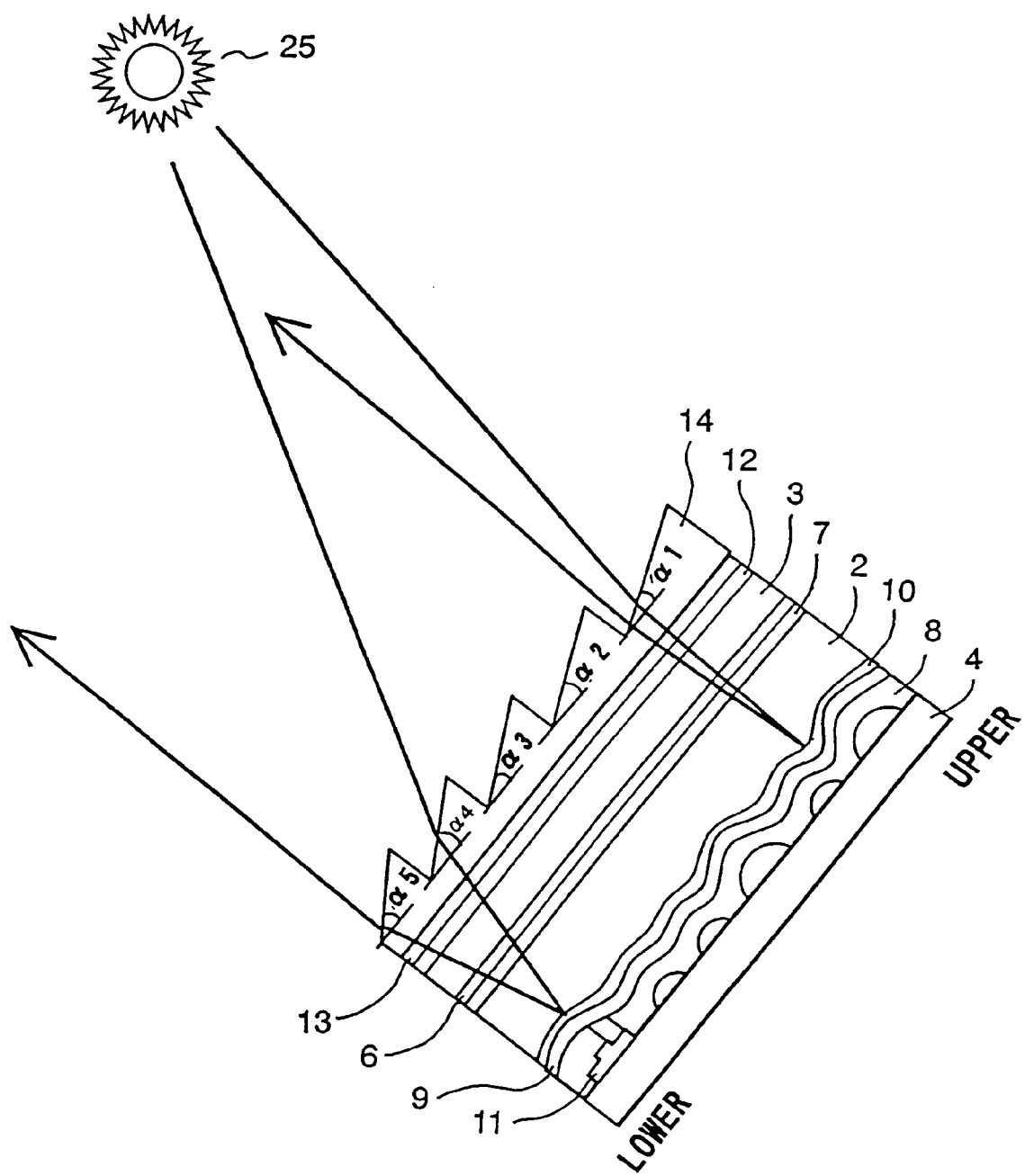
FIG. 6 is a view showing a case of using a prism array sheet having different tilt angles in the display plane in the reflective display device of the present invention.

The tilt angle of the prisms may gradually be changed in the display plane. This will be described with reference to FIG. 6. Since the display panel is flat, the angle at which an illuminator 25 (especially, a point light source) is faces to the display panel differs between the upper side and the lower side of the display panel. In an illumination environment in which only a specific point light source exists during observation of the display panel, light is incident on positions of the display panel at different angles depending on the coordinates of the positions in the display plane. Therefore, the light amount reflected back to the observer differs depending on the coordinates, generating a brightness distribution in the display area. This problem can be overcome by designing as shown in FIG. 6 where the tilt angle of the prisms is gradually changed in the display plane so that the entire panel returns the light in the observer direction. By adopting this design, no variation in brightness over the entire panel occurs, and thus high-quality display can be attained.

In general, as shown in FIG. 6, the angle at which the light source faces to the display panel is greater on the lower side of the panel than on the upper side. Therefore, the tilt angle may be made gradually greater from the upper side toward the lower side of the panel ($\alpha 1<\alpha 2<\alpha 3<\alpha 4<\alpha 5$). This technique of changing the tilt angle in the display plane is especially effective when adopted for a stationary display device with a large display screen where the location on which the panel is mounted, the angle at which the panel is oriented, and the position of the light source have been fixed.

Figure 7A:
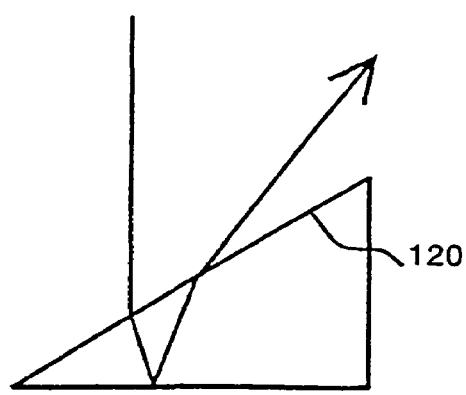
FIGS. 7A, 7B, 7C, and 7D are views of examples of the shape of the tilt faces of the prism array sheet.
Figure 7B:
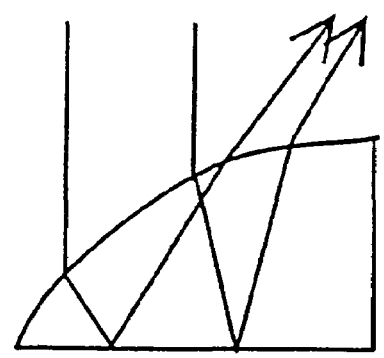
Figure 7C:
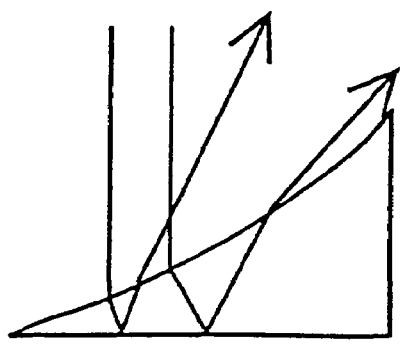
Figure 7D:
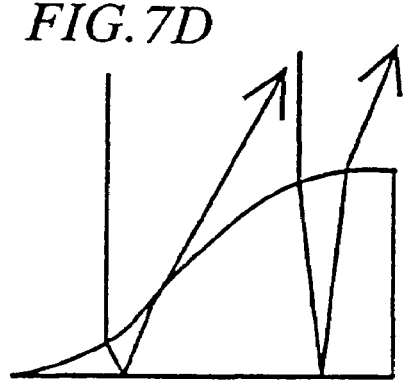

In Embodiment 1 described above, the tilt faces 120 of the prisms are flat. The present invention is not limited to this, but the prism tilt faces 120 may be curved. FIGS. 7A, 7B, 7C, and 7D show examples of applicable shapes of the tilt faces 120. The prism tilt faces may be curved as shown in FIGS. 7B, 7C, and 7D, in addition to being flat as shown in FIG. 7A. The curve may be of a convex shape (FIG. 7B), a concave shape (FIG. 7C), or a convex/concave combined shape (FIG. 7D). Note however that any tilt angle of the curve must be set so that incident light from the direction normal to the panel is allowed to outgo back from the panel.

Using the curved prisms as described above is equivalent to using prisms having different tilt angles. This provides a distribution for the incident direction of the principal ray on the display layer 2, and as a result, the outgoing angle of the incident light ray from the display layer 2 varies in the parallel direction of the display plane. More specifically, a light ray incident on a position of a curved face in which the angle formed between the tangent at the position and the bottom surface of the prism is small outgoes in a direction of which the polar angle $\theta$ is small. On the contrary, a ray incident on a position of a curved face in which the tilt angle is large outgoes in a direction of which the polar angle $\theta$ is large. The polar angle as used herein refers to the angle $\theta$ shown in FIG. 1A.

Figure 8A:
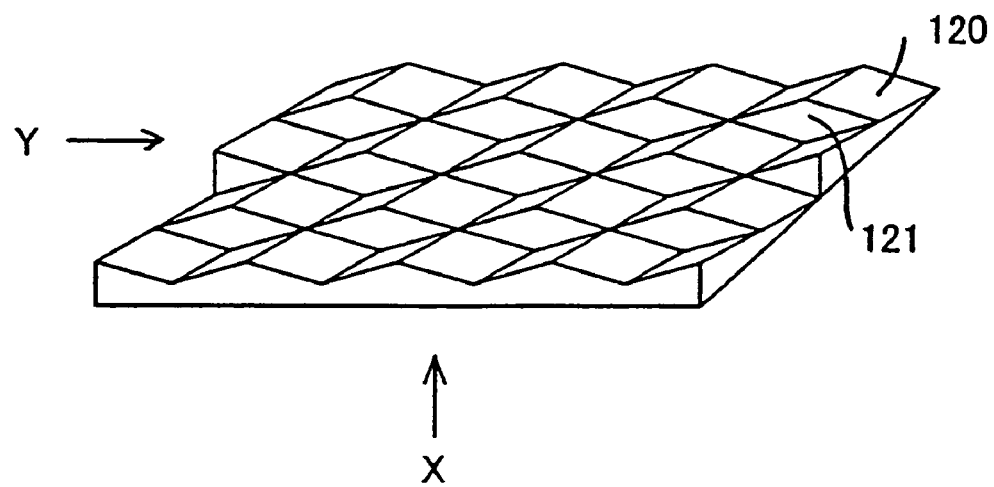
FIG. 8A is a perspective view of a prism array sheet.
Figure 8B:
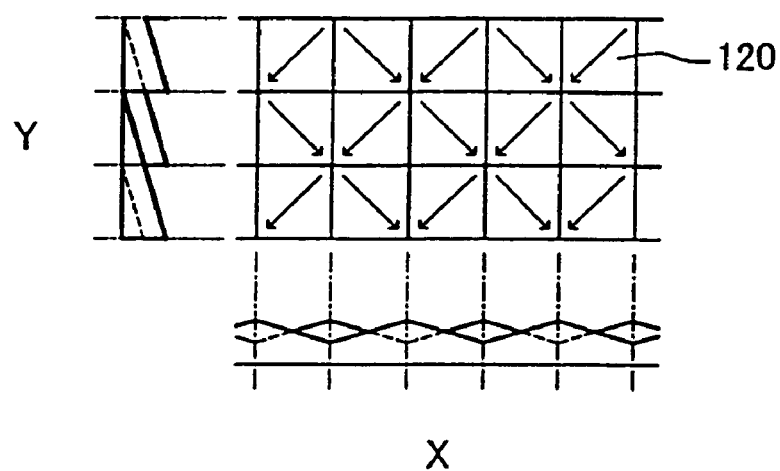
FIG. 8B is a view combining a partial plane view of the prism array sheet of FIG. 8A and side views observed at positions X and Y in FIG. 8A.
Figure 9A:
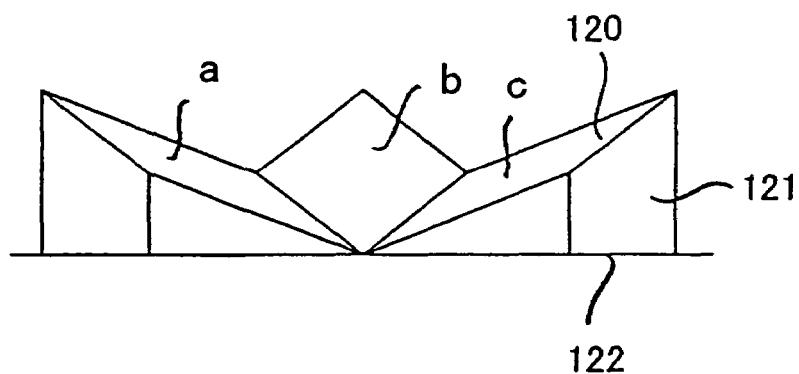
FIGS. 9A and 9B show another prism array sheet, where
Figure 9B:
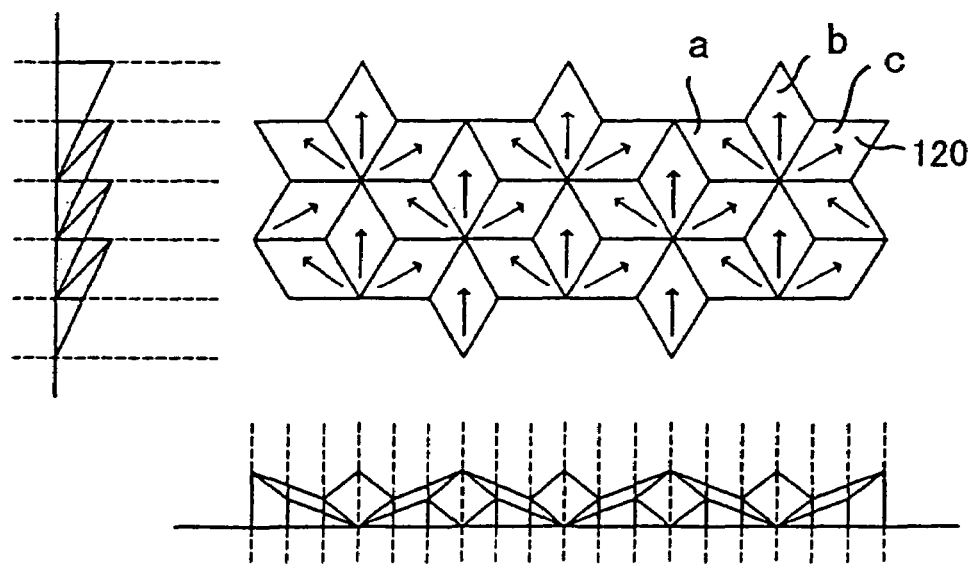

The prism array sheet described above had a stripe shape in a sawtooth section, in which the directions normal to the tilt faces extend in the same direction. The present invention is not limited to this. For example, prism array sheets having a fixed tilt angle $\alpha$ of 20 degrees in which the normal vectors to the tilt faces point in a plurality of directions were examined as follows. In this examination, the other faces 121 of the prism array sheet was made vertical to the display plane so that they were not directly observed when the display panel was observed from the observer direction. As for the shape of the prisms, a shape obtainable by closest packing on a flat surface is preferable from the standpoint of effective use of the incident light. FIGS. 8A and 8B and FIGS. 9A and 9B illustrate prism array sheets actually examined. FIG. 8A is a perspective view of a prism array sheet, and FIG. 8B is a view combining a partial plane view of the prism array sheet of FIG. 8A and side views observed at positions X and Y in FIG. 8A. FIGS. 9A and 9B show another prism array sheet, where FIG. 9A is an enlarged perspective view of three prisms a, b, and c and FIG. 9B is a view combining a plane view and side views of the prism array sheet. The arrows in FIGS. 8B and 9B extend on the tilt faces 120 from a portion closer to the bottom surface 122 of the prism array sheet toward a portion farther therefrom.

Each of the prism array sheets described above was placed on the liquid crystal display device described in Embodiment 1, and the dependence of reflection brightness on the azimuth of the illumination axis was measured. As a result, confirmed was the effect that the distribution of light capturing angles expanded in terms of the azimuth direction. The azimuth as used herein refers to the angle $\Psi$ shown in FIG. 1A. Thus, it was found that, by forming the tilt faces so that the vector normals to the tilt faces point in a plurality of directions (especially, azimuth directions) to provide anisotropy, the resultant reflective liquid crystal display device improved the brightness to the azimuth direction.

Although two examples were described with reference to FIGS. 8A, 8B, 9A, and 9B, the shape of the tilt faces is not limited to the illustrated ones. The brightness of the display can be improved by properly designing the directions of the normal vectors to respective tilt faces of each unit of the prisms according to the use and the illumination environment of the device.

Figure 10A:
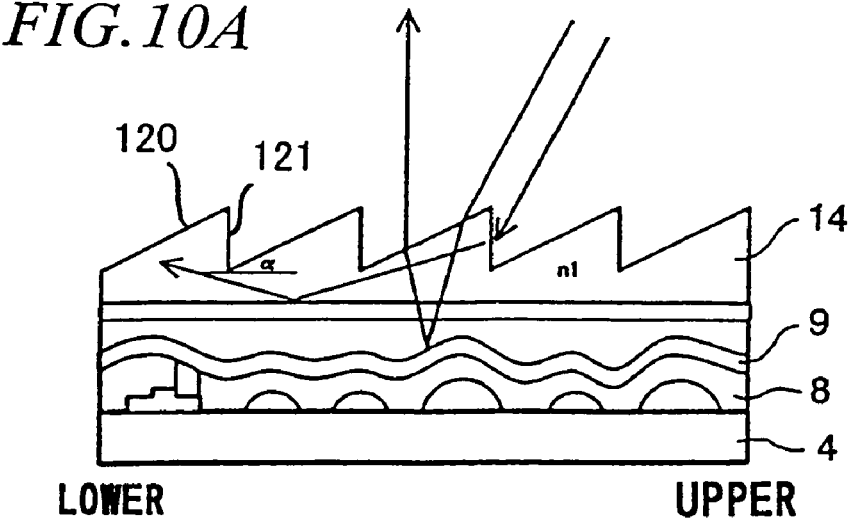
FIGS. 10A, 10B, and 10C are views showing the light path of a principal ray observed when no treatment is made for the faces of the prism array sheet other than the tilt faces having a tilt angle $\alpha$ (10A), when an absorption layer is formed on each of these faces (10B), and when a reflection layer is formed on each of these faces (10C).
Figure 10B:
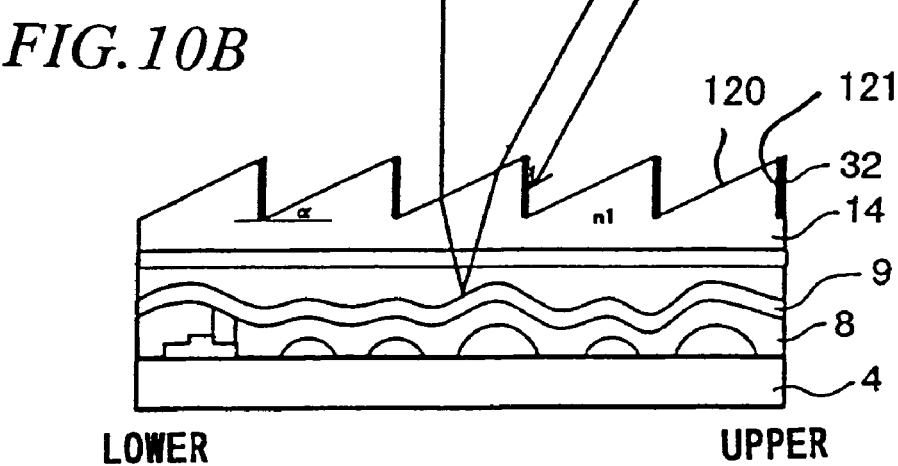

Also confirmed was the effect that the display quality improved by forming an absorption layer on each of the faces roughly vertical to the display plane. This effect will be described with reference to FIGS. 10A, 10B, and 10C. As shown in FIG. 10A, when no absorption layer is formed, a light ray incident on the face 121 follows a path different from that of a light ray incident on the tilt face 120 tilted at a predetermined angle $\alpha$, and outgoes in a direction different from the observer direction (normal to the display device) as stray light. This stray light is not always free from influencing the display, but provides not some little influence because part of the stray light may reach the eyes of the observer depending on the angle at which he or she observes the display device. To avoid this influence, in this embodiment, as shown in FIG. 10B, an absorption layer 32 is formed on each face 121 roughly vertical to the display plane for absorbing such stray light. As a result, unnecessary light influencing the display is cut by the absorption layer 32, and thus the display quality improves.

In the reflective liquid crystal display device of FIG. 10B, the absorption layer 32 was formed on each face 121 of the prism array sheet. Alternatively, each face 121 may be roughened to improve the display quality as in the case of forming the absorption layer 32. The reason is that light incident on the roughened face is scattered and therefore the amount of light entering the prism array sheet 14 decreases. The faces 121 can be roughened in the following manner. The prism array sheet 14 is normally produced by embossing. The roughening of the faces 121 is performed by adjusting the roughed state of the surfaces of portions of a mold used for the embossing corresponding to the faces 121 of the prism array sheet 14. Specifically, the surfaces of portions of the mold corresponding to the faces 121 are left unpolished. By using such a mold, the faces 121 are roughened. On the contrary, if the surfaces of portions of the mold corresponding to the faces 121 are polished, the faces 121 are flat without convex and concave portions.

Figure 10C:
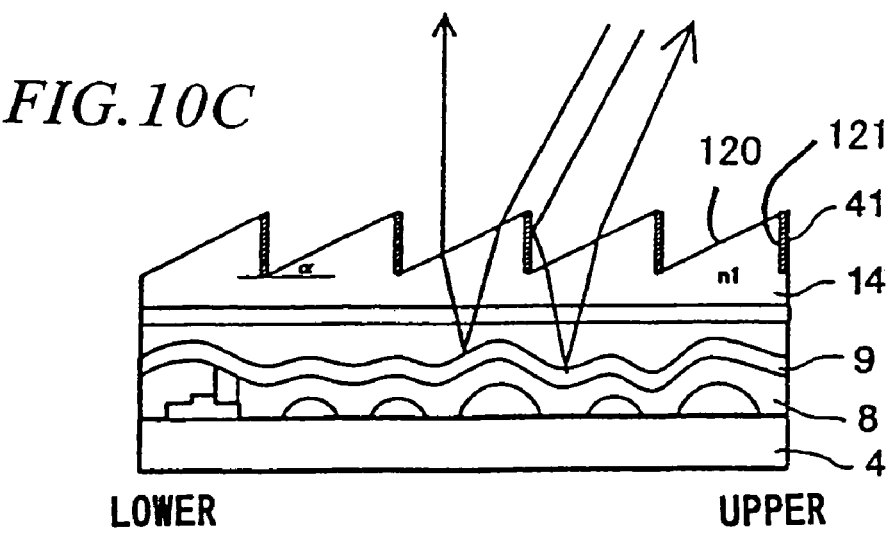

It was also recognized that the lightness of the display improved by forming a reflection layer on each face roughly vertical to the display plane. When no reflection layer is formed as shown in FIG. 10A, a light ray incident on the face 121 follows a path different from that of a light ray incident on the tilt face 120 tilted at a predetermined angle $\alpha$, and outgoes as stray light without contributing to improvement in the brightness of the display. However, as shown in FIG. 10C, by forming a reflection layer 41 on each face 121 roughly vertical to the display plane, light incident on the face 121 is allowed to outgo in a direction close to the observer direction (normal to the display device). This improves apparent brightness of the display. The reflection layers 41 can be formed by performing oblique evaporation for the prisms using a mask. Although the prism array sheet is placed so that the principal surface (having a plurality of the tilt faces) of the prism array sheet faces to the observer side in FIGS. 10B and 10C, the configuration of the prism array sheet is not limited to this. The principal surface of the prism array sheet may face to the reflective electrode, and the absorption layer 32 or the reflection layer 41 is formed on the faces 121 of the prism array sheet. Alternatively the faces 121 may be roughened. In this case, it is also possible to improve the apparent brightness of the display is improved.

Figure 11A:
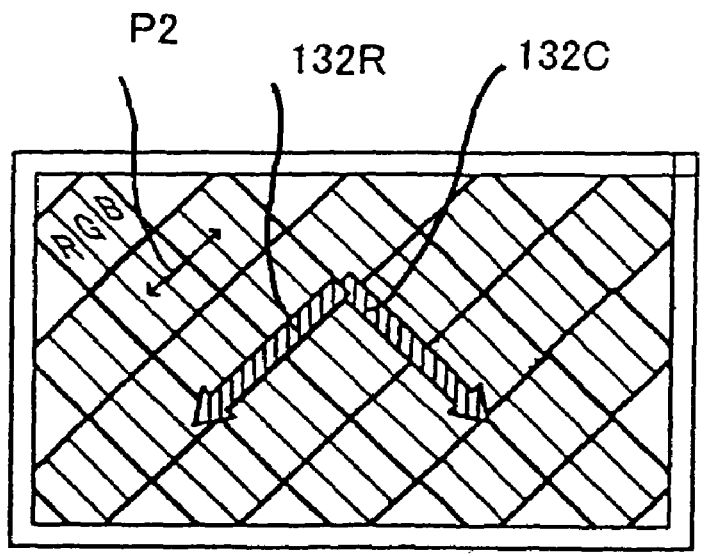
FIG. 11A is a plane view showing an array of color filters of the display device 1.
Figure 11B:
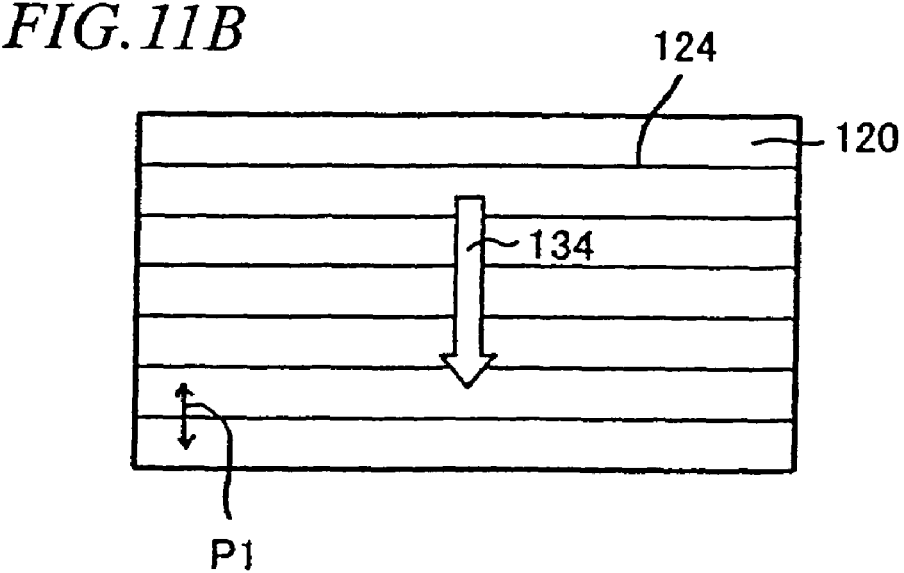
FIG. 11B is a plane view of the prism array sheet.
Figure 11C:
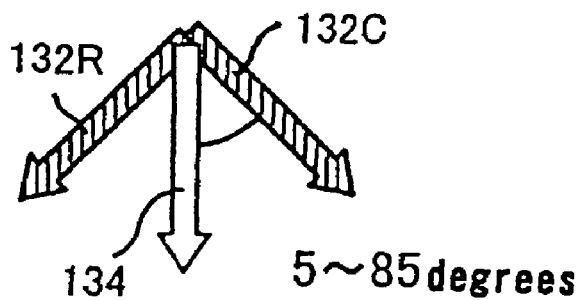
FIG. 11C is a view showing the positional relationship between the color filters and the prism array sheet.

The present inventors also made examination for a preferable prism pitch, which will be described with reference to FIGS. 11A, 11B, and 11C. FIG. 11A is a plan view of an array of color filters formed in the display device 1. FIG. 11B is a plan view of the prism array sheet. FIG. 11C shows the positional relationship between the color filters and the prism array sheet.

According to the survey conducted by the present inventors, the observer generally observes a liquid crystal display device at a distance of about 30 cm. Also, it is known that an observer having normal eyesight finds difficulty in recognizing the pixel pitch of 200 µm of the display device at the observation distance of 30 cm. Therefore, when the observer observes the display device at the distance of 30 cm, the pitch of the prism array sheet will not be recognized by the observer as long as the prism pitch is 200 µm or less. The pixel pitch as used herein refers to the distance between the geometric centers of gravity of adjacent pixels as shown by P2 in FIG. 11A. In the illustrated example, the pixels are assumed to be square. The prism pitch as used herein refers to the distance between the geometric centers of gravity of adjacent tilt faces 120 as shown by P1 in FIG. 11B, which corresponds to the width of one prism.

The prism pitch was actually examined, and as a result, it was found that when the prism pitch P1 was greater than the pixel pitch P2, the fringes of the prisms in a stripe shape were conspicuous when the panel was observed, resulting in a significant decrease in display quality. When the prism pitch P1 was equal to or smaller than the pixel pitch P2, such prism fringes were hardly recognized when the panel was observed at a general distance, causing no decrease in display quality. Desirably, therefore, the prism pitch P1 is equal to or smaller than the pixel pitch P2.

A moiré pattern is sometimes generated when the display panel is observed due to interference between the periodic structure of prisms and the pixel pattern of the display device. To overcome this problem, the present inventors examined the prism pitch and the direction of the array of the prisms in more detail. The period P of the moiré pattern is represented by $$P=1/(1/P1-1/P2) \quad (3)$$

wherein P1 is the prisms pitch and P2 is the pixel pitch of the display device.

The problem of the moiré pattern will be overcome if the period P of the moiré pattern can be made smaller than the pixel pitch P2 of the display device, that is, if the expression $$P2>1/(1/P1-1/P2) \quad (4)$$

is satisfied. From this expression, the relationship of P1<P2/2 is derived. This indicates that if the prism pitch is smaller than a half of the pixel pitch, the moiré pattern should be made inconspicuous. The present inventors produced prism arrays having different prism pitches, and performed subjective evaluation. As a result, it was confirmed that no moiré pattern was observed when the prism pitch P1 was smaller than P2/2.

On the other hand, it was found that when the prism pitch P1 was extremely small, diffracted light was generated from the prisms, and also, due to poor processing accuracy, the originally transparent prisms caused scattering, resulting in significant decrease in display quality. The prism pitch therefore is preferably 5 µm or more. In consideration of this and the above condition, the prism pitch P1 is preferably 5 µm or more and also desirably less than a half of the pixel pitch P2 of the display device.

Generation of the moiré pattern can also be reduced by varying the pitches of the plurality of prisms of the prism array sheet (adopting random prism pitches). Also found is that the moiré pattern disappears by placing the prism array so that the prism array direction denoted by 134 is a little oblique to the pixel array direction (row direction denoted by 132R or column direction denoted by 132C) of the color filters as shown in FIGS. 11A, 11B, and 11C, rather than completely matching these array directions. The present inventors actually produced a display device including color filters printed obliquely by 25 degrees with respect to the display portion and switching elements corresponding to the color filters formed on the counter substrate, and executed display for the display device. As a result, good display free from a moiré pattern was attained. Thus, the prism array direction 134 of the prism array sheet preferably does not match with the pixel array direction 132R or 132C of the color filters. According to the examination by the inventors, the angle formed by the above two array directions is preferably about 5 to about 85 degrees.

Embodiment 2

Figure 12:
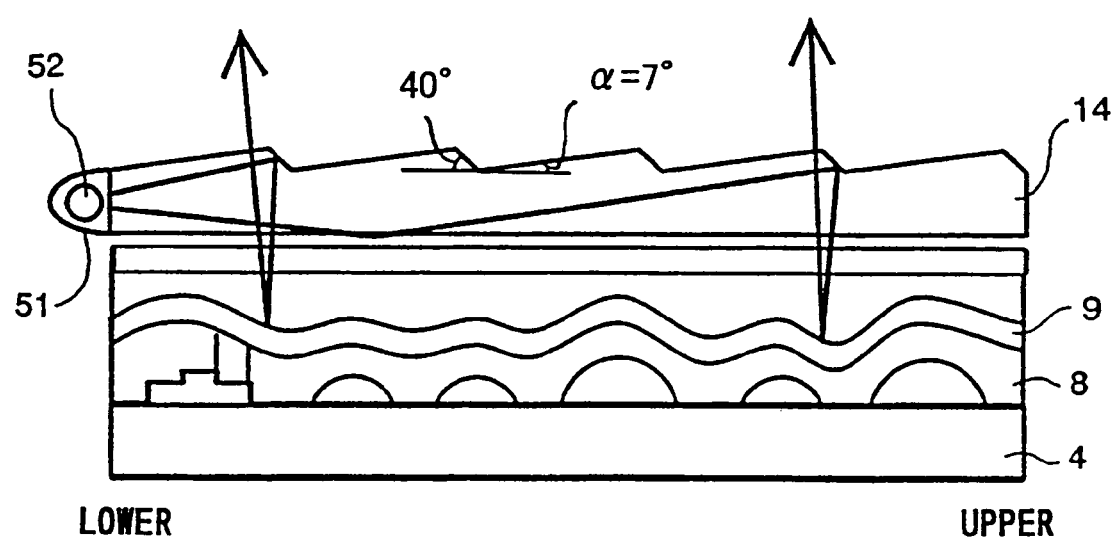
FIG. 12 is a schematic cross-sectional view of a reflective display device of Embodiment 2 of the present invention.

A reflective display device of Embodiment 2 of the present invention will be described with reference to FIG. 12. The prism array sheet in this embodiment additionally functions as a light-guiding plate for front light by using a light-guiding transparent material as the base material and adjusting the tilt angle of the prisms. As shown in FIG. 12, the reflective display device of Embodiment 2 includes a specific light source 52 made of a cold-cathode tube and a reflector 51 for reflecting light emitted from the specific light source 52 toward the light-guiding plate. These components 51 and 52 constitute a light introduction section and are placed on one side of the prism array sheet 14 functioning as the light-guiding plate. In this embodiment, the prism array sheet 14 includes alternate repetition of tilt faces having a tilt angle α of 7 degrees with respect to the display plane and the other faces having an angle of 40 degrees with respect to the display plane. The prism pitch is 30 µm. The area of the tilt faces having a tilt angle of 7 degrees is wider than that of the other faces as shown in FIG. 12.

In the reflective display device with the above construction, a light ray incident on the prism array sheet 14 from the side thereof is totally reflected by a 40-degree tilted face to enter the display device, and after being reflected by a reflection element in the display device, outgoes from a wide 7-degree tilted face. In this way, bright display can be provided.

Embodiment 3

In Embodiment 1, the surface of the prism array sheet 14 was in direct contact with the air and had a sawtooth shape. Such an exposed uneven surface is susceptible to scratches and dirt, and therefore the prism array sheet 14 tends to deteriorate significantly. In this embodiment, the surface of the prism array sheet 14 is flattened with a transparent base material to protect the uneven surface thereof.

As a transparent base material 61 covering the surface of the prism array sheet 14, it is suitable to use a material having a refractive index different from the refractive index n1 of the material of the prism array sheet 14. The refractive index n2 of the transparent base material 61 may be larger or smaller than the refractive index n1 of the prism base material. Note however that as in Embodiment 1, the array direction, the refractive index n1, and the tilt angle α of the prism array sheet 14 and the refractive index n2 of the flattening transparent base material 61 must be determined so that a light ray incident on the display device from an illuminator is allowed to outgo back to the observer side.

Hereinafter, the conditions required for the refractive index n1 and the tilt angle α of the transparent material used as the prism array sheet 14 and the refractive index n2 of the flattening transparent base material 61 will be discussed taking the case that a light ray is incident from the observer direction (normal to the display device) as an example, as in the discussion in Embodiment 1. A light ray incident on the display device passes straight through the flattening base material 61, and enters the display device after being refracted at the refractive index interface between the flattening base material 61 and the prism array sheet 14 in a direction determined by the tilt angle α and the refractive index n1 of the prism array sheet 14 and the refractive index n2 of the flattening base material 61. The incident light ray is then reflected/scattered inside the display device, while the principal ray thereof is reflected in its regular reflection direction to reach a tilt face of the prism array sheet 14.

Figure 13A:
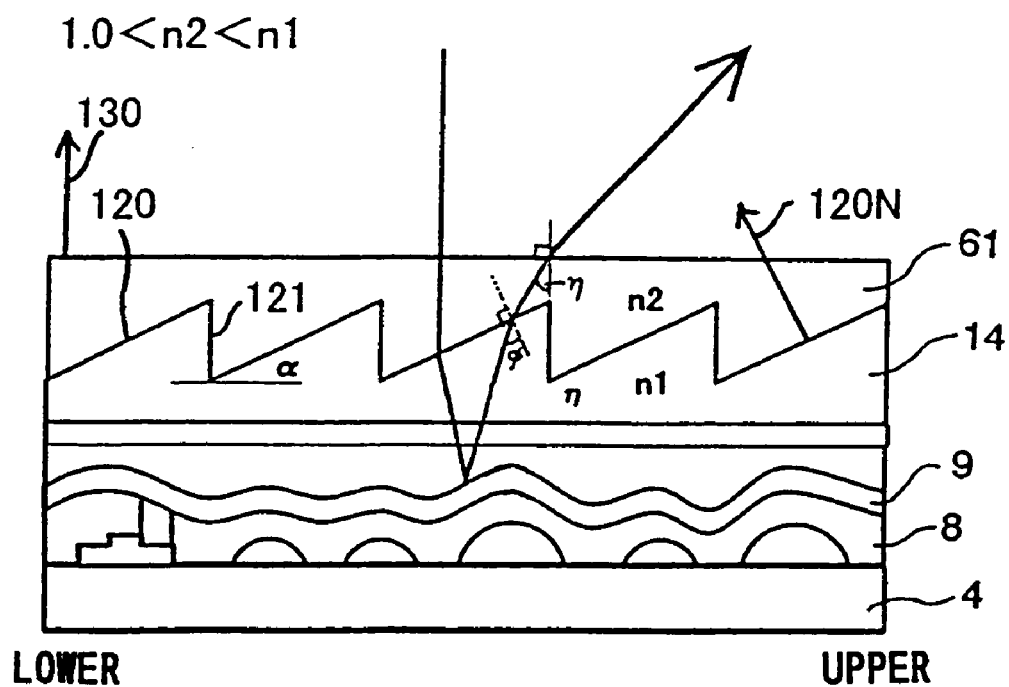
FIGS. 13A and 13B are views showing functions obtained by flattening the surface of a prism array sheet in Embodiment 3 of the present invention.

When the refractive index n2 of the flattening base material 61 is greater than that of the air (n=1.0) and smaller than the refractive index n1 of the prism array sheet 14 (1.0<n2<n1) as shown in FIG. 13A, the principal ray is allowed to outgo back to the observer side if the angle φ (φ=2α−arc sin(sin α·n2/n1)) at which the principal ray reaches the tilt face of the prism array sheet 14 is smaller than the total reflection angle arc sin(n2/n1) at the interface between the prism array sheet 14 and the flattening base material 61 and also the angle η (η=arc sin [(n1/n2)·sin {2α−arc sin(sin α·n2/n1)}]−α) at which the principal ray reaches the interface with the air to outgo is not smaller than the total reflection angle arc sin(1/n2) at the interface between the flattening base material 61 and the air. That is, satisfying both material 61 and the air. That is, satisfying both expressions $$2\alpha - \text{arc sin}(\sin \alpha \cdot n2/n1) < \text{arc sin}(n2/n1) \quad (5)$$

$$\text{arc sin } [(n1/n2)\cdot\sin \{2\alpha - \text{arc sin}(\sin \alpha \cdot n2/n1)\}] - \alpha < \text{arc sin}(1/n2) \quad (6)$$

is the condition required for the shape of the prism array sheet 14 and the refractive indices of the base materials. As an example, a prism array sheet covered with a flattening base material was produced using PEN (n1=1.66) manufactured by Teijin Ltd. as the base material of the prism array sheet 14 with a tilt angle α of 30 degrees, and CYTOP (n2=1.34) manufactured by Asahi Glass Co., Ltd. as the flattening base material 61, and was subjected to display indoors. As a result, good display with high lightness was obtained.

Figure 13B:
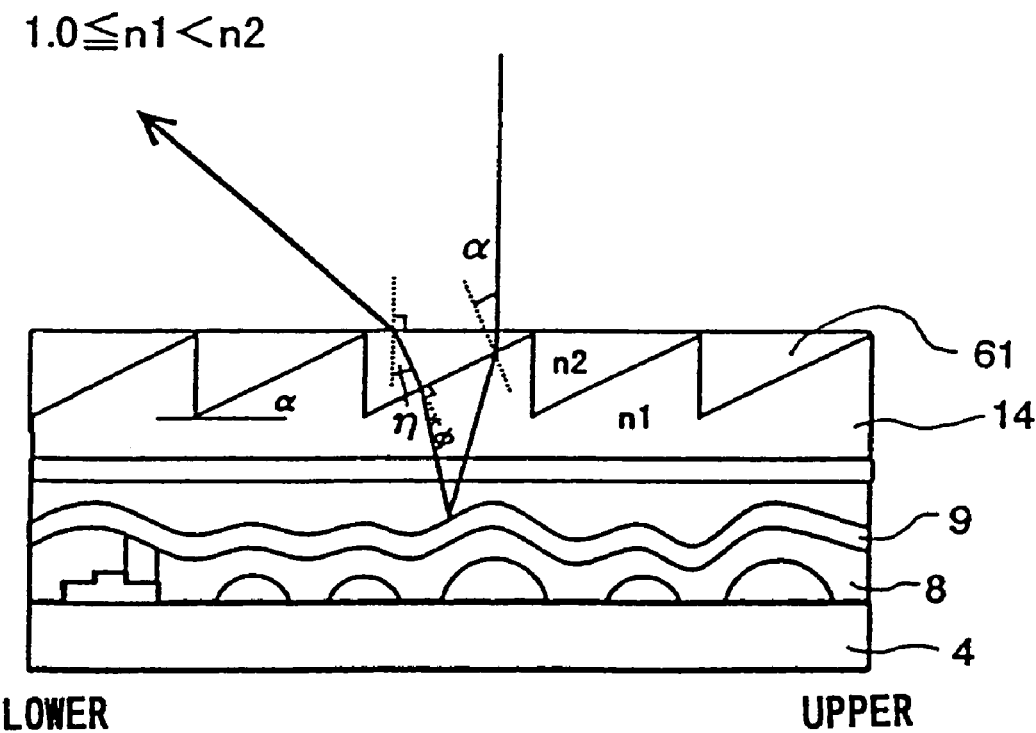

On the contrary, when the refractive index n2 of the flattening base material 61 is greater than the refractive index n1 of the transparent base material of the prism array sheet 14 (1.0≦n1<n2) as shown in FIG. 13B, the principal ray is allowed to outgo back to the observer side if the angle φ at which incident light reaches a tilt face of the prism array sheet 14, which is equal to the angle α, is smaller than the total reflection angle arc sin(n1/n2) at the interface between the prism array sheet 14 and the flattening base material 61 and also the angle η at which the principal ray reaches the interface with the air to outgo (η=α−arc sin [(n1/n2)·sin {2α−arc sin((n2/n1)·sin α)}]) is smaller than the total reflection angle arc sin(1/n2) at the interface between the flattening base material 61 and the air. That is, satisfying both expressions $$\alpha < \text{arc sin}(n1/n2) \quad (7)$$

$$\alpha - \text{arc sin } [(n1/n2)\cdot\sin \{2\alpha - \text{arc sin}((n2/n1)\cdot\sin \alpha)\}] < \text{arc sin}(1/n2) \quad (8)$$

is the condition required for the shape of the prism array sheet 14 and the refractive indices of the base materials. The material of the prism array sheet 14 is not necessarily a solid, but may be the air, water, liquid crystal, or the like. As an example, a prism array sheet was produced using air (n1=1.00) as the base material with a tilt angle α of 20 degrees, covered with the flattening base material 61 made of an acrylic resin (n2=1.49), and was subjected to display indoors. As a result, good display with high lightness was obtained.

In the above respective conditions, if either one of the critical angle conditions is not satisfied, the incident light is totally reflected at the prism interface failing to return to the observer side, and as a result the display is darkened.

Thus, in this embodiment, by flattening the surface of the prism array sheet with a transparent material, it is possible to obtain the effect that the prism surface becomes less susceptible to scratches and dirt while retaining the effect of improving the lightness. Therefore, a more practical prism array sheet can be produced.

As shown in FIG. 13B, when the refractive index n2 of the flattening base material 61 is greater than the refractive index n1 of the transparent base material of the prism array sheet 14 (1.0≦n1<n2), the principal ray outgoes in the direction 120N normal to the tilt faces. This implies that, in order to direct light to outgo in the observer direction (normal to the display device), the prism array sheet 14 should be placed so that the direction 120N normal to the tilt faces having a tilt angle α points in the direction of the light source.

An anti-reflection film or an anti-glare film may further be formed on the flattening base material 61 on the observer side of the display device to reduce occurrences of reflection of an image in the display and surface reflection. By forming such a film, high-quality display is attained.

Although the prism array sheet 14 having the refractive index n1 is placed so that the principal surface (having a plurality of the tilt faces) of the prism array sheet faces to the observer side and the principal face is covered with the flattening transparent base material 61 having the refractive index n2 in FIGS. 13B and 13B, the configuration of the display device of the present embodiment is not limited to this. The prism array sheet 14 having the refractive index n2 may be used instead of the flattening transparent base material 61 having the refractive index n1 in FIG. 13B or 13B, and the flattening transparent base material 61 may be used instead of the prism array sheet 14 in FIG. 13B or 13B. In this case, it is also possible to obtain the similar configuration to that of the present embodiment. This modified display device is obtained, for example, by the following method: The prism array sheet 14 having the refractive index n2 is placed so that the principal face of the prism array sheet 14 faces to the reflective electrode 9. The prism array sheet 14 is bonded to the device by the transparent adhesive resin having the refractive index n1. It should be noted that the anti-reflection film may preferably be formed on the observer surface of the display device which contacts with the air.

Embodiment 4

Figure 14:
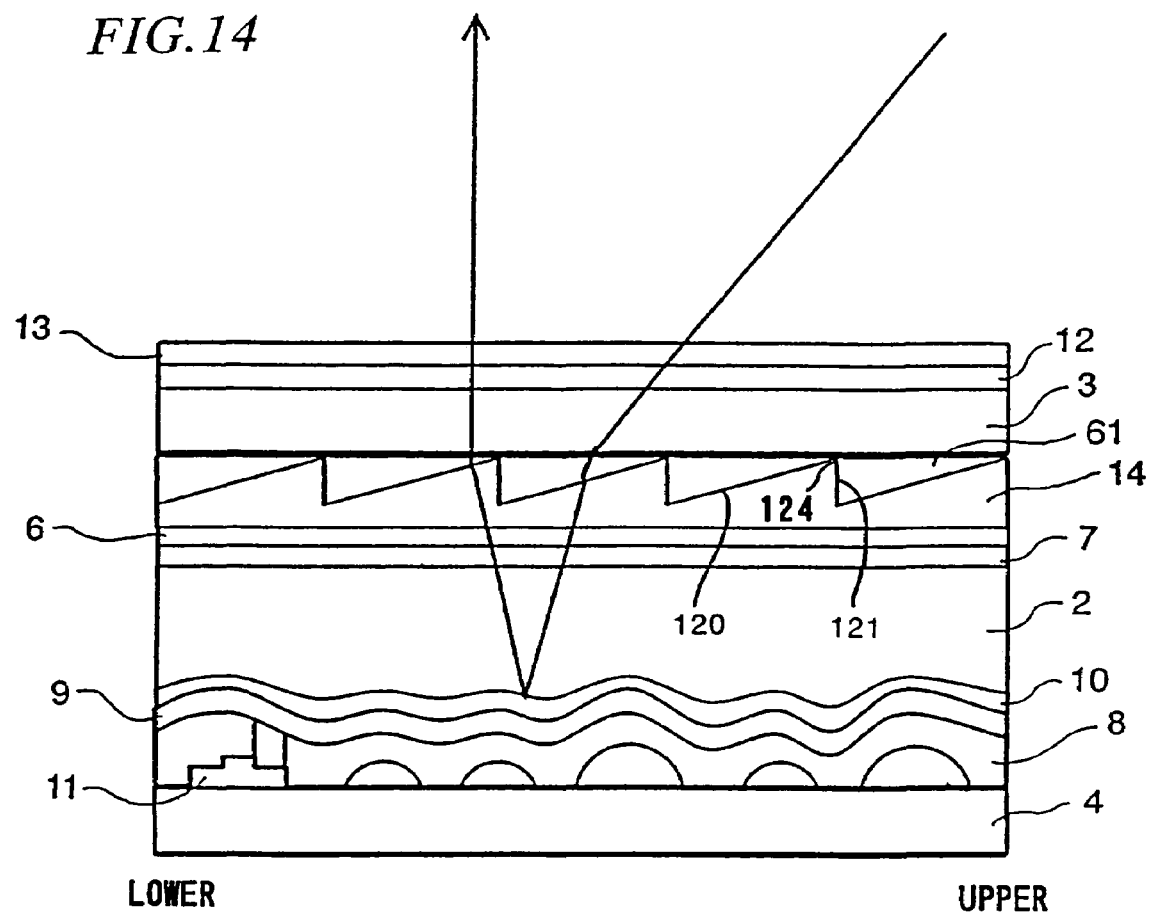
FIG. 14 is a schematic cross-sectional view of a reflective display device of Embodiment 4 of the present invention.

A reflective display device of Embodiment 4 of the present invention will be described with reference to FIG. 14. FIG. 14 is a schematic cross-sectional view of a reflective display device of this embodiment. As shown in FIG. 14, the prism array sheet 14 flattened with the transparent base material 61 is provided, not on the observer-side surface of the observer-side substrate 3, but between the observer-side substrate 3 and the liquid crystal layer 2. A light ray incident on the reflective display device passes through the polarizing plate 13, the retardation plate 12, and the observer-side substrate 3, to reach the interface between the transparent base material 61 and the observer-side substrate 3. The light ray is refracted at this interface and reaches the prism array sheet 14, where the light ray is refracted again and then incident on the liquid crystal layer 2. The light ray is reflected by the reflective electrode 9 and passes back through the liquid crystal layer 2, to reach the prism array sheet 14, where the light ray is refracted toward the observer direction, that is, the direction normal to the display device, to outgo from the display device to the observer side. The polarizing plate and the retardation plate are placed so that incident light is circularly polarized by passing through these plates. This construction can prevent light reflected at the respective interfaces between the retardation plate, the glass substrate, the prisms, and the liquid crystal layer from outgoing back to the observer side, and thus improves the display quality.

In this embodiment, PEN (n1=1.66) was used as the base material of the prism array sheet 14, and CYTOP (n2=1.34) was used as the flattening base material 61. The tilt angle α of the prism faces was 25 degrees, and the prism pitch was about 50 μm. The resultant reflective display device improved in parallax of display, and thus good display with high lightness free from parallax was attained.

In Embodiments 3 and 4, protection of the surface of the prism array sheet 14 was performed by flattening the uneven surface of the prism array sheet 14. Other methods can also be adopted to attain this objective. For example, the simplest method is to bond a protection sheet to the surface of the prism array sheet 14. In this method, however, when the prism array sheet 14 is to be in contact with the air so that an interface is formed between the prism array sheet 14 and the air, the protection sheet must be bonded so as not to collapse the air layer interposed between the protection sheet and the prism array sheet. Specifically, the protection sheet is bonded to the prism array sheet 14 via an adhesive so that the protection sheet comes into contact with ridges 124 formed between the tilt faces 120 and the other faces 121 adjacent to the tilt faces 120. The contact area between the prism array sheet 14 and the protection sheet is preferably as small as possible, for the following reason.

If the contact area between the prism array sheet 14 and the protection sheet is large, the adhesive force of the protection sheet to the prism array sheet 14 improves, but this reduces the area of the interface between the prism array sheet 14 and the air layer. In normal, the refractive index of the adhesive layer is roughly equal to that of the prism array sheet 14. Therefore, if the contact area between the prism array sheet 14 and the adhesive layer is large while the area of the interface between the prism array sheet 14 and the air layer is small, it may possibly be impossible to obtain the effect of the present invention of improving the front brightness (brightness in the direction roughly normal to the display plane) by utilizing the difference in refractive index between the prism array sheet 14 and the air layer. In consideration of this, the contact area between the prism array sheet 14 and the protection sheet is preferably as small as possible. The protection sheet may even be kept apart from contact with the prism array sheet 14 by being supported by an encasement of the liquid crystal display device. Preferably, the observer-side surface of the protection sheet (surface opposite to that bonded to the prism array sheet 14) is AR-treated, to suppress reflection from the display plane and thus realize more easy-to-view display.

The surface of the prism array sheet 14 may also be protected by methods other than that described above of forming a protection sheet on the surface of the prism array sheet 14. For example, a hard coat may be provided on the surface of the prism array sheet 14, or a touch panel may be provided on the surface of the prism array sheet 14.

Figure 18:
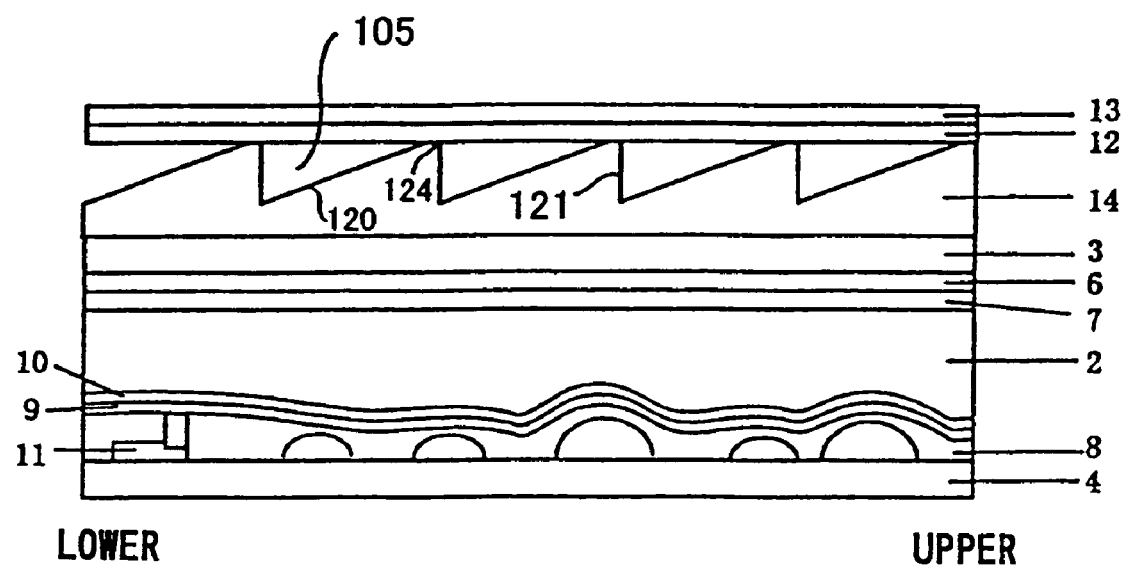
FIG. 18 is a schematic cross-sectional view of a modified reflective display device of Embodiment 4 of the present invention.

As yet another method, as shown in FIG. 18, the retardation plate 12 and the polarizing plate 13 may be placed on the surface of the prism array sheet 14 to be used as the protection layer for the prism array sheet 14. The reflective liquid crystal display device of FIG. 18 is different from the liquid crystal display device 1 of FIGS. 1A and 1B in that the retardation plate 12 and the polarizing plate 13 are placed on the observer-side surface of the prism array sheet 14. In the display device of FIG. 18, the retardation plate 12 is placed on the observer-side surface of the prism array sheet 14 having a plurality of tilt faces 120 so as to be in contact with the ridges 124 formed between the tilt faces 120 and the adjacent other faces 121 of the prism array sheet 14. An air layer 105 is interposed between the tilt faces 120 of the prism array sheet 14 and the retardation plate 12. The polarizing plate 13 is placed on the observer-side surface of the retardation plate 12. In the liquid crystal display device with the above construction, the prism array sheet 14 is preferably made of an optically isotropic material, that is, a material having no birefringence. For example, the prism array sheet 14 may be made of PEN (n1=1.66) manufactured by Teijin Ltd. or made of a triacetyl cellulose (TAC) film. The observer-side surface of either one of the retardation plate 12 and the polarizing plate 13, or preferably those of both thereof are desirably AR-treated. This suppresses reflection from the display plane and thus realizes more easy-to-view display. Although both the retardation plate 12 and the polarizing plate 13 were placed on the surface of the prism array sheet, the retardation plate 12 may be placed as required.

Thus, by placing the retardation plate 12 and the polarizing plate 13 to additionally function as the protection layer for the prism array sheet 14, the number of components can be reduced compared with the display device provided with a separate protection sheet or the like. This enables reduction in the cost, thickness, and weight of the resultant products.

Although the prism array sheet 14 is placed so that the principal surface (having a plurality of the tilt faces) of the prism array sheet 14 faces to the observer side in the fourth embodiment, the structure of the display device is not limited to this. The prism array sheet 14 may be placed so that the principal surface faces to the reflective electrode 9. In this modified device, the protection sheet may be bonded to the back surface (the flat face having no tilt faces on the opposite side of the principal face) of the prism array sheet 14, or the observer-side substrate 3, and so on may be bonded to the back surface. This improves the mechanical strength of the prism array sheet 14 itself.

Embodiment 5

A direct-view type reflective display device includes a scattering element somewhere in the display device. In Embodiments 1 to 4, the scattering element was realized by the reflective electrode having an uneven surface. Other types of scattering element can also be used. For example, the scattering element may be realized by a polymer-dispersed liquid crystal layer that modulates transmission/scattering, or by a scattering film composed of two or more materials having different refractive indices.

Figure 15:
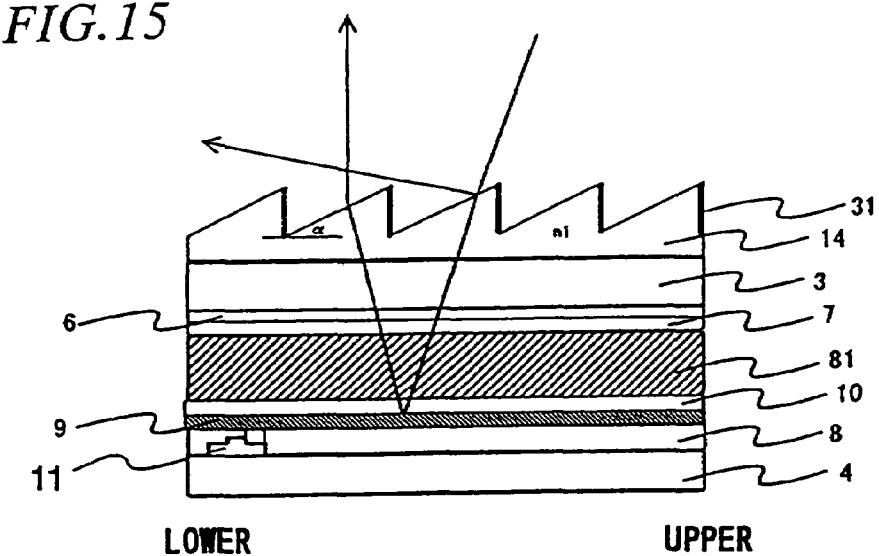
FIG. 15 is a schematic cross-sectional view of a reflective display device of Embodiment 5 of the present invention.

In this embodiment, the scattering element is realized by a polymer-dispersed liquid crystal layer, which will be described with reference to FIG. 15.

The reflective display device of this embodiment is substantially the same in construction as the reflective display device of FIGS. 1A and 1B, except that an absorption layer 31 is formed on each of the faces of the prism array sheet 14 roughly vertical to the display plane, that a polymer-dispersed liquid crystal layer (liquid crystal/polymer combined scattering modulation layer) 81 is used, and that the resin layer 8 does not have an uneven surface.

In this embodiment, the liquid crystal/polymer combined scattering modulation layer 81 was formed in the following manner. First, a liquid crystal material having positive dielectric anisotropy and a photopolymerizable material containing 2% of a photoinitiator are mixed at a ratio of 80:20 and dissolved together. A photopolymerizable material exhibiting isotropy at room temperature was used, so that the mixture of the liquid crystal material and the photopolymerizable material exhibited isotropy at room temperature.

The mixture was injected into a space between the two substrates 3 and 4, and then subjected to light irradiation such as UV irradiation at room temperature to polymerize the photopolymerizable material and thus separate the polymer phase from the liquid crystal phase. As the UV irradiation, about 10 mW/cm$^2$ (365 nm) of UV was supplied for one minute while adjusting so that the intensity distribution was 5% or less in the display area. The layer showed a scattering state simultaneously with the occurrence of the phase separation.

As the liquid crystal/polymer combined scattering modulation layer 81, a polymer-dispersed liquid crystal material, a nematic-cholesteric phase transfer liquid crystal material, liquid crystal gel, or the like may be used. Further, the mode of modulating the liquid crystal layer between the transmission state and a state having at least scattering function is provided. Specifically, for example, a cholesteric liquid crystal material switching between the transmission and reflection states, which is provided with a light diffusing characteristic by controlling the domain size of liquid crystal molecules, may be used. Alternatively, a polymer-dispersed liquid crystal material having a holographic function switching between the transmission and reflection states, which is provided with a light diffusing characteristic by exposure to diffused light, may be used. A polymer-dispersed liquid crystal material is obtained by mixing and dissolving together a low molecular-weight liquid crystal composition and a non-polymerized prepolymer, injecting the mixture into a space between the substrates, and polymerizing the prepolymer. The kind of the polymer-dispersed liquid crystal material is not specifically limited as long as it is obtained by polymerizing a prepolymer. For example, usable is a cured product (UV-cured liquid crystal material) having a liquid crystalinity obtained by curing a mixture of an UV-curable prepolymer and a liquid crystal composition under irradiation with an active light ray such as ultraviolet radiation.

The thus-produced scattering/transmission switching type polymer-dispersed liquid crystal material was used as the liquid crystal layer, and a mirror-surface reflective electrode 9 was placed on the back of the liquid crystal layer. The prism array sheet including the absorption layer 31 formed on each of the vertical faces was placed on the observer-side substrate 3 of the display device, and display was performed. The other conditions for the placement of the prism array sheet were the same as those adopted in Embodiment 1. That is, the prism array sheet was made of an acrylic resin (n1=1.492) as the base material, and had a sawtooth shape including alternate repetition of tilt faces tilted by a predetermined angle α of 25 degrees with respect to the display plane and the other faces vertical to the display plane. The tilt faces were in contact with the air (n=1.0), and the pitch of the prisms was 50 μm. The resultant display device succeeded in providing display with high lightness.

Embodiment 6

Figure 16:
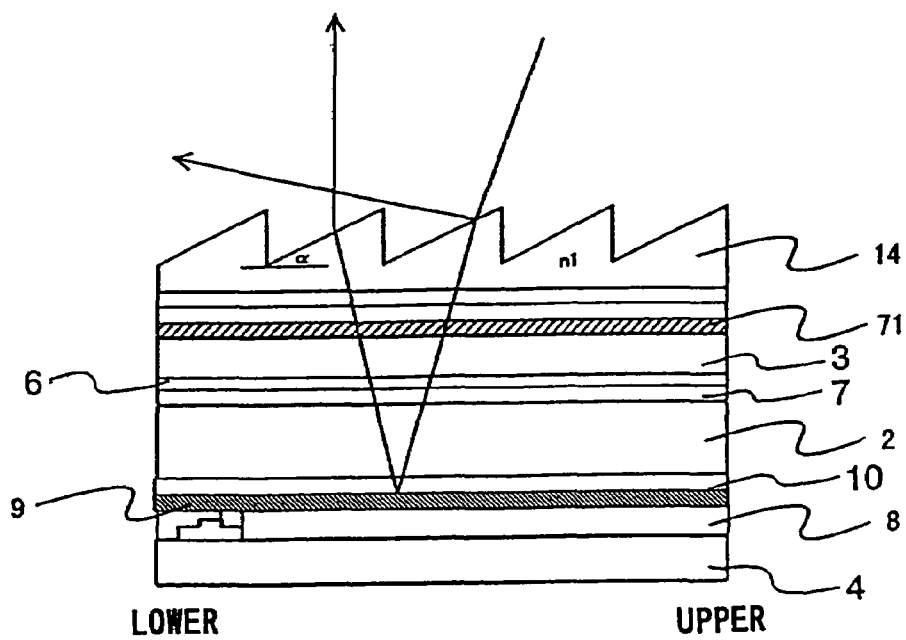
FIG. 16 is a schematic cross-sectional view of a reflective display device of Embodiment 6 of the present invention.
Figure 17:
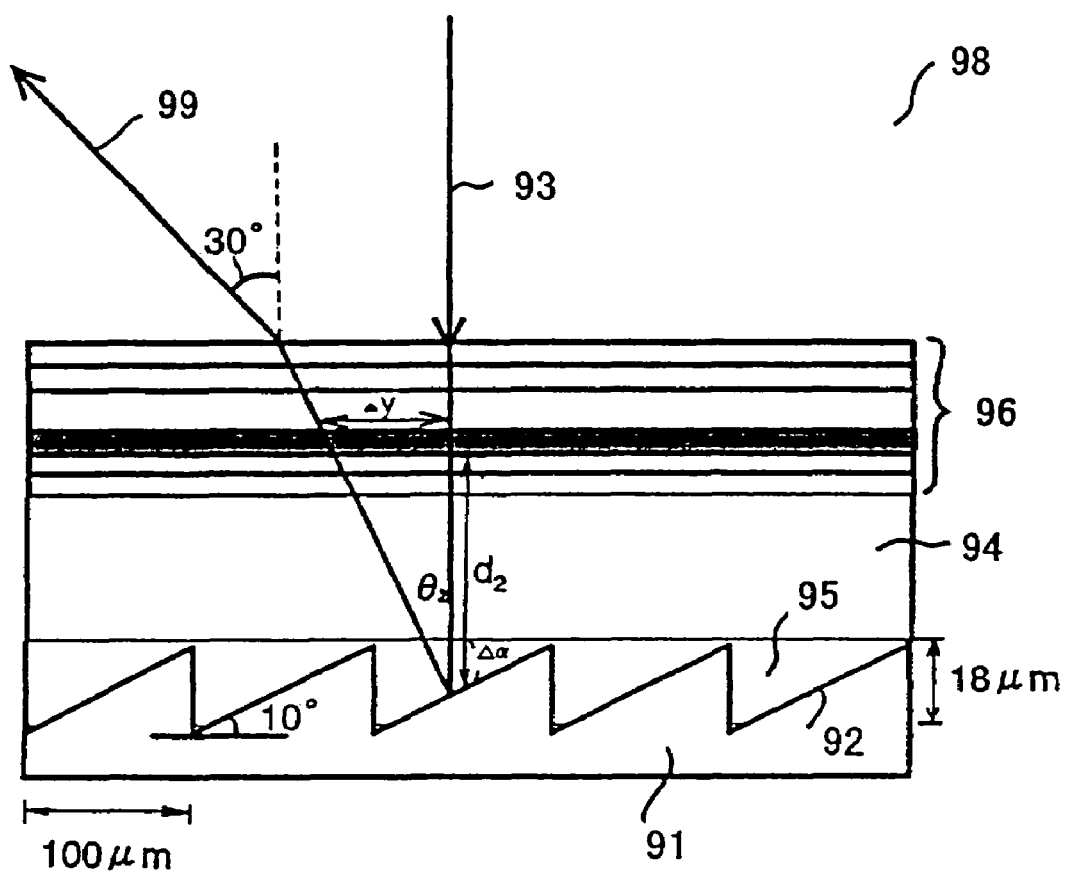
FIG. 17 is a view of a conventional reflective display device.

FIG. 16 schematically illustrates a reflective display device of Embodiment 6 of the present invention. The reflective device of this embodiment is substantially the same as that of Embodiment 1 in construction, except that the reflective electrode 9 and the resin layer 8 are substantially flat and, to compensate this, a scattering film 71 is formed on the observer-side surface of the observer-side substrate 3, that is, on the surface opposite to the liquid crystal layer 2. As the scattering film 71, usable are a blend of two kinds of materials having different refractive indices, such as polymethyl methacrylate and a styrene-acrylonitrile copolymer, controlled to have a spinodal decomposition structure, and a film obtained by dispersing spherical particulates of polystyrene in a matrix of polymethyl methacrylate.

The resultant display device was subjected to display as in Embodiment 1, and as a result, good display was attained.

Embodiment 7

A reflective display device of Embodiment 7 is the same as that of Embodiment 1, except that a prism array sheet made of a material having a variable refractive index is used as the prism array sheet 14. Detailed description on the construction is therefore omitted in this embodiment.

Specifically, a prism array sheet 14 filled with a material capable of electrically modulating the refractive index (for example, a liquid crystal material) is formed to provide a function capable of electrically modulating the refractive index. This refractive index-variable prism array sheet 14 can electrically modulate the refractive index and modulate the outgoing angle of an incident light ray. Therefore, by placing this prism array sheet 14 on the observer-side surface of the reflective display device, it is possible to modulate the angle at which an illuminator faces to the display device depending on the occasion. Thus, the lightness of the display device can be adjusted depending on the illumination circumstances.

Embodiment 8

A reflective display device of Embodiment 8 will be described with reference to FIG. 19. The reflective display device of this embodiment is especially suitable for the environment where the brightness of a light source on the observer side is extremely high.

Figure 19:
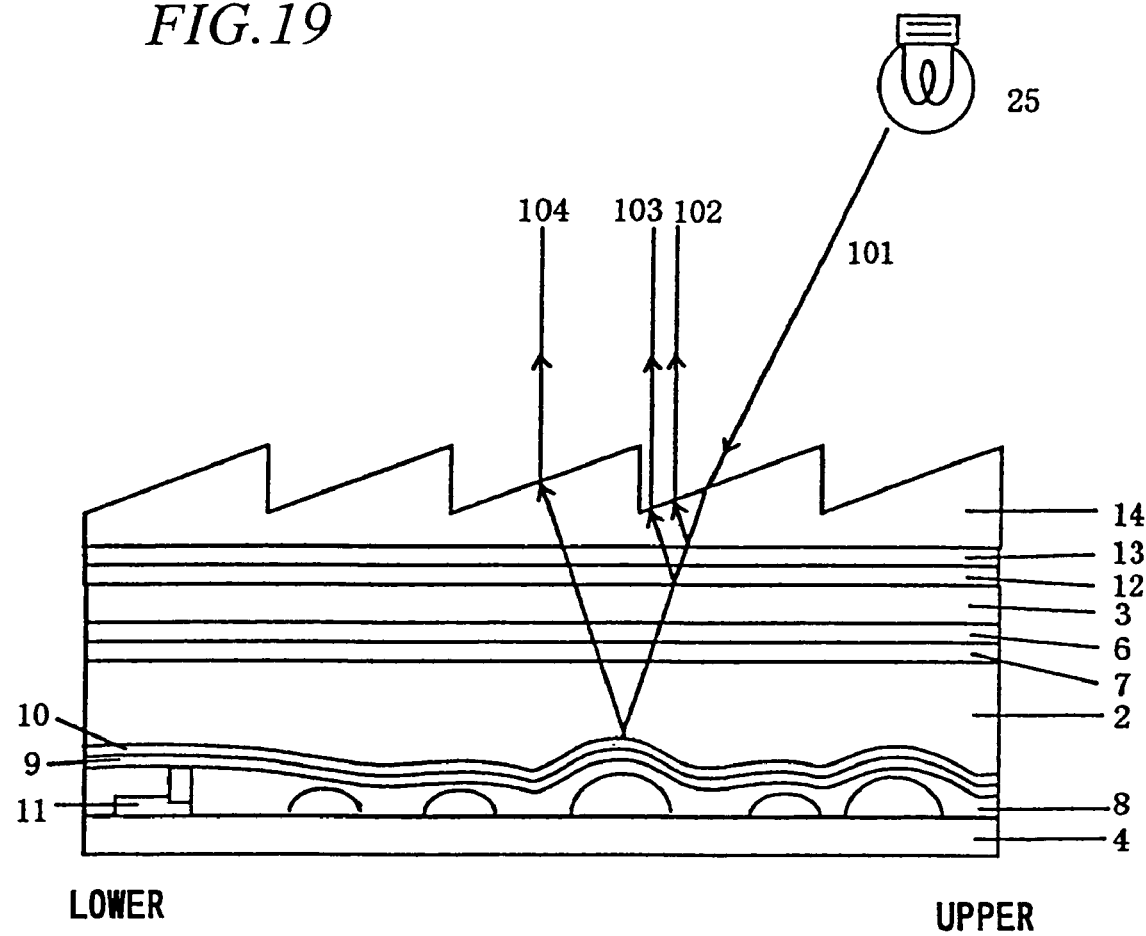
FIG. 19 is a schematic cross-sectional view of a reflective display device of Embodiment 8 of the present invention.

As shown in FIG. 19, light 101 emitted from a light source 25 with extremely high brightness is refracted by the prism array sheet 14 and proceeds in the liquid crystal display device. The light 101 is partly reflected at all interfaces existing in the liquid crystal display device while proceeding in the liquid crystal display device. In FIG. 19, for simplification, the reference numeral 102 denotes reflected light from the interface between the polarizing plate 13 and the prism array sheet 14, while the reference numeral 103 denotes collectively reflected light from all the interfaces existing between the polarizing plate 13 and the liquid crystal layer 2, that is, the interface between the polarizing plate 13 and the retardation plate 12, the interface between the retardation plate 12 and the substrate 3, the interface between the substrate 3 and the transparent electrode 6, the interface between the transparent electrode 6 and the alignment film 7, and the interface between the alignment film 7 and the liquid crystal layer 2. The reference numeral 104 denotes reflected light from the reflective electrode 9 on the surface of the liquid crystal layer 2 opposite to the observer-side surface thereof. The reflected light 104 is absorbed by the polarizing plate 13 or allowed to pass through the polarizing plate 13 and outgo to the observer side to be used as display light, depending on the orientation state of the liquid crystal layer 2.

The reflected light 103 is absorbed by the polarizing plate 13 when the polarizing plate 13 and the retardation plate 12 are placed to satisfy the quarter wavelength condition. When the placement of the polarizing plate 13 and the retardation plate 12 does not satisfy the quarter wavelength condition, the reflected light 103 passes through the polarizing plate 13 by the amount of deviation from the quarter wavelength condition and outgoes to the observer side. As for the reflected light 102, the entire thereof outgoes to the observer side because an absorption element such as the polarizing plate 13 does not exist on the path of the reflected light 103.

When the reflected light 102 and 103 outgoes to the observer side, an image of the light source 25 is reflected in the display. This greatly deteriorates the quality of black display, in particular, and causes reduction in contrast ratio.

In the liquid crystal display device of this embodiment, an UV-curable resin having a refractive index similar to the refractive index (1.5) of TAC used for the polarizing plate 13 was used as the material of the prism array sheet 14. For comparison, a liquid crystal display device using PEN (refractive index 1.66) as the material of the prism array sheet was fabricated. As a result of comparison between the liquid crystal display device of this embodiment and that of the comparative example, it was found that the liquid crystal display device of this embodiment succeeded in reducing occurrences of surface reflection and reflection of an image of the light source 25 in the display, exhibiting superiority in black display, and preventing reduction in contrast ratio, compared with the liquid crystal display device of the comparative example. The reason is that since the prism array sheet 14 and the polarizing plate 13 in contact with the prism array sheet 14 were made of materials having roughly the same refractive indices, the reflectance of the light from the light source 25 at the interface between the prism array sheet 14 and the polarizing plate 13 decreased. As a result, reflection of an image of the light source 25 in the display was reduced.

In Embodiments 1–8, the reflective display device in which the prism array sheet 14 is placed so that the principal surface (having a plurality of the tilt faces) of the prism array sheet 14 faces to the observer side are exemplified. The configuration of the reflective display device of the present invention is not limited to this. The prism array sheet 14 may be placed so that the principal surface faces to the reflective electrode 9 in those devices. Hereinafter, examples at such modified reflective display devices will be described in Embodiments 9 and 10. It should be noted that the principal surface of the prism array sheet 14 may face to the observer side in Embodiments 9 and 10.

Embodiment 9

In a reflective display device of Embodiment 9, front brightness is improved by use of the difference in refractive index between the prism array sheet 14 and an air layer in contact with the prism array sheet 14, and also the abrasion resistance of the prism array sheet 14 is improved. The reflective display device of this embodiment will be described with reference to FIGS. 20, 21A, 21B, 21C, and FIG. 22.

FIG. 20 illustrates a reflective display device of a comparative example of this embodiment. The reflective display device of FIG. 20 is different from the reflective display device 1 of FIGS. 1A and 1B in that the surface of the prism array sheet 14 (surface having a plurality of tilt faces 120) faces the liquid crystal layer 2 to improve the abrasion resistance of the prism array sheet 14.

In the reflective display device of FIG. 20, in addition to the placement of the prism array sheet 14 facing the liquid crystal layer 2 described above, the direction 120N normal to the tilt faces 120 is tilted toward the lower side of the display plane with respect to the direction 130 normal to the display plane. The tilt faces 120 are most preferably formed so that the direction in which incident light from the light source 25 proceeds is the same as the direction normal to the tilt faces 120. An air layer 105 is interposed between the prism array sheet 14 and the polarizing plate 13. Incident light 101 reflected by the reflective electrode 9 is allowed to outgo from the display device as display light 104 in a direction roughly normal to the display plane by use of the difference in refractive index between the air layer 105 and the prism array sheet 14. However, the reflective display device of FIG. 20 has the problem that since reflected light 102 at the interface between the air layer 105 and the polarizing plate 13 has a large intensity, the display quality greatly deteriorates. This poor display quality is not sufficiently improved even when the observer-side surface of the polarizing plate 13 is AR-treated.

Figure 21A:
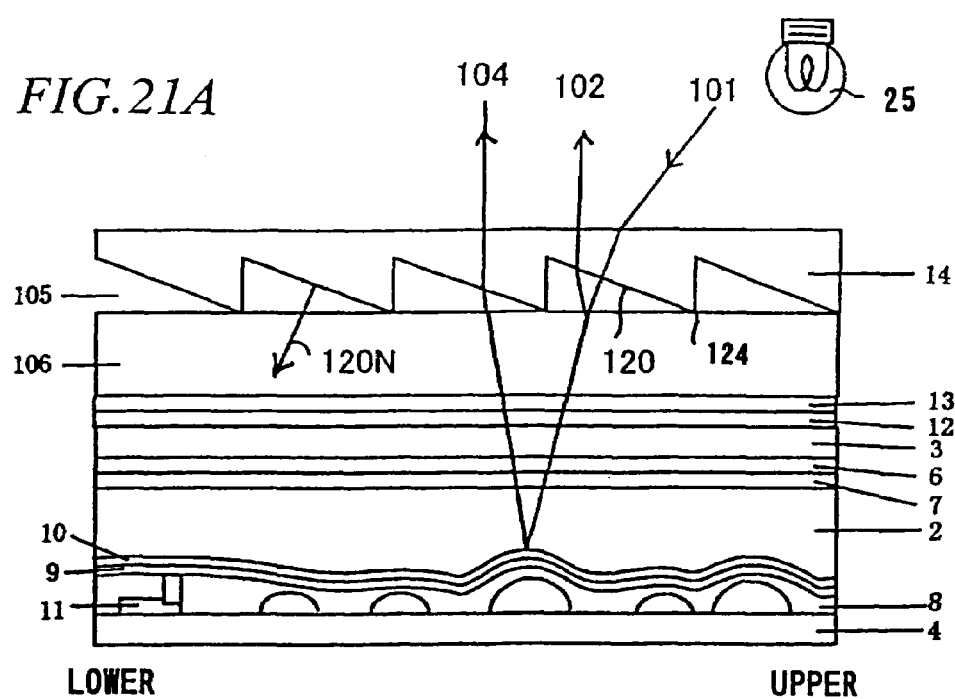
FIGS. 21A and 21B are cross-sectional views in the vertical direction and the lateral direction, respectively, of a reflective display device of Embodiment 9.
Figure 21B:
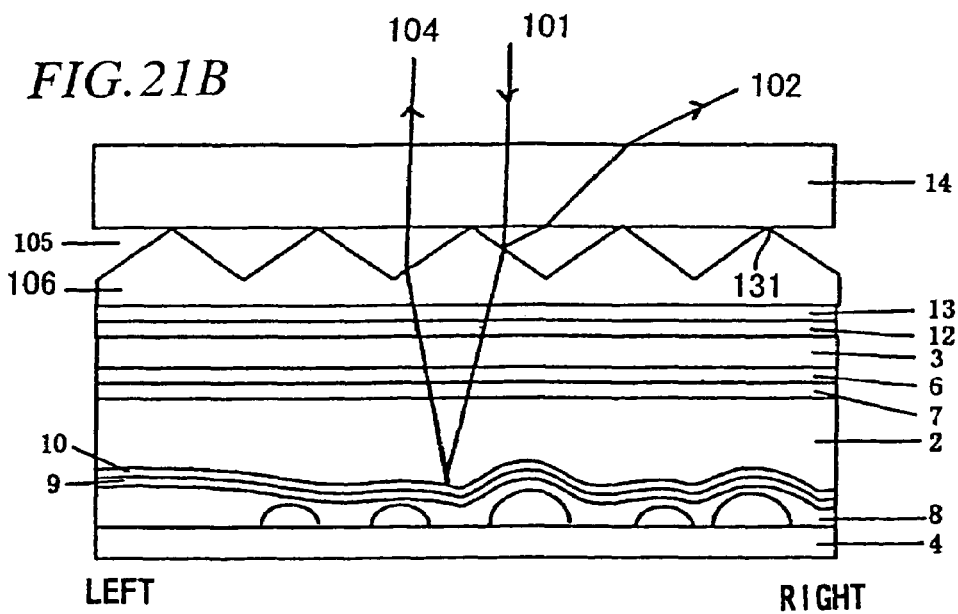
Figure 21C:
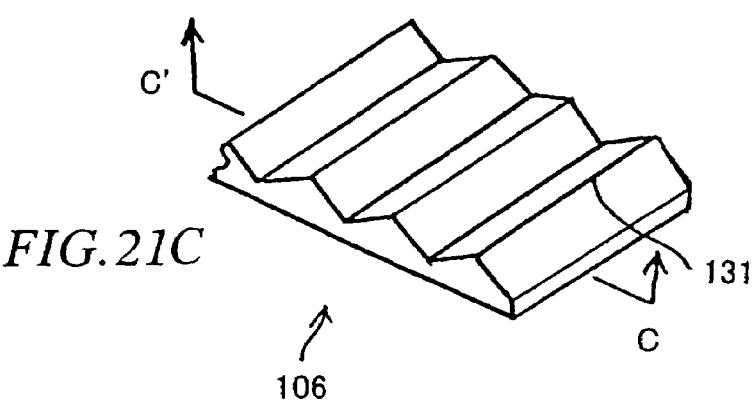
FIG. 21C is a partial perspective view of a prism sheet 106.

To improve the display quality, the reflective liquid crystal display device of this embodiment is provided with an additional prism array sheet 106 as shown in FIGS. 21A, 21B, and 21C. FIGS. 21A and 21B are cross-sectional views in the vertical and lateral directions, respectively, of the reflective display device of this embodiment. FIG. 21C is a partial perspective view of the prism array sheet 106.

The reflective liquid crystal display device of this embodiment is different from the reflective liquid crystal display device of the comparative example shown in FIG. 20 in that the prism array sheet 106 shown in FIG. 21C is formed between the prism array sheet 14 and the polarizing plate 13, in addition to the prism array sheet 14.

As shown in FIG. 21C, the prism array sheet 106 has a plurality of ridges 131 in parallel with each other, with the same distance between the adjacent ridges 131. The cross section along line C–C' of the prism array sheet 106 is composed of a series of isosceles triangles having the same shape and size. The prism array sheet 106 is made of the same material as that used for the prism array sheet 14 described above. The prism array sheet 106 is placed with respect to the prism array sheet 14 so that the ridges 131 of the former are orthogonal to the ridges 124 of the latter. The placement of the prism array sheet 106 with respect to the prism array sheet 14 is preferably adjusted appropriately in consideration of the influence of the moiré pattern.

The shape of the prism array sheet 106 is not limited to that shown in FIG. 21C although the shape shown in FIG. 21C is preferred. For example, the prism array sheet 106 may have a shape varying in the distance between the adjacent ridges 131 and having a C–C' cross section composed of a series of isosceles triangles having different shapes and sizes or a series of scalene triangles. Alternatively, the prism array sheet may include a plurality of prisms arranged in a delta pattern, or may include an array of a plurality of microlenses or lenticular lenses.

Referring to FIGS. 21A and 21B, a path of light incident on the reflective liquid crystal display device will be described. Light 101 emitted from the light source 25, for example, placed on the observer side of the reflective display device is reflected by the reflective electrode 9 and outgoes in a direction roughly normal to the display plane as display light 104 by use of the difference in refractive index between the air layer 105 and the prism array sheet 14, as in the reflective liquid crystal display device of FIG. 20 as the comparative example.

Reflected light 102 of the incident light 101 from the light source 25, reflected at the interface between the air layer 105 and the prism array sheet 106, outgoes in a direction different from the direction of the display light 104 as shown in FIG. 21B. Although, in FIG. 21A, the directions of the reflected light 102 and the display light 104 appear to be the same and be unseparated from each other, they are spatially (three-dimensionally) separated from each other as shown in FIG. 21B. Thus, good display is attained when viewed from the front.

Figure 22:
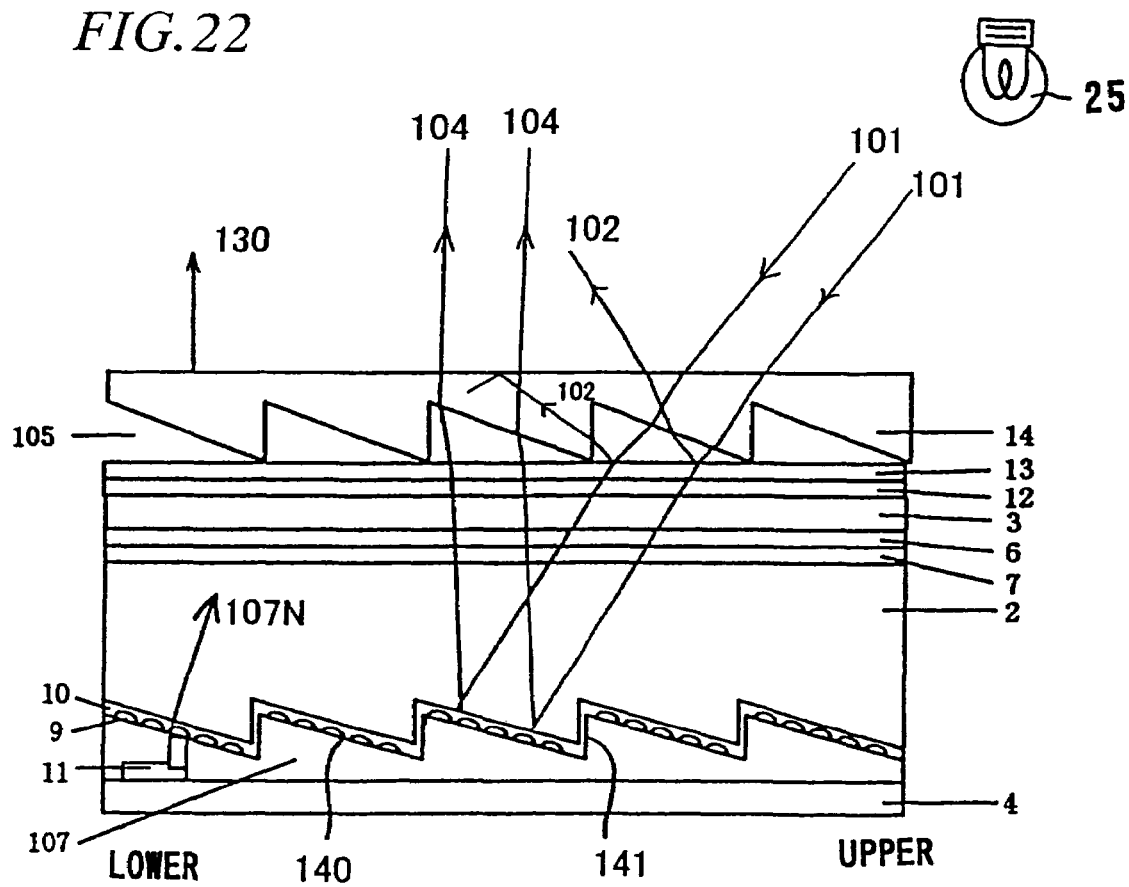
FIG. 22 is a schematic cross-sectional view of a modified reflective display device of Embodiment 9 of the present invention.

A modification of the reflective liquid crystal display device shown in FIGS. 21A and 21B will be described with reference to FIG. 22. The reflective liquid crystal display device of FIG. 22 is different from the reflective liquid crystal display device of FIG. 20 as the comparative example mainly in that a tilt member 107 is placed between the liquid crystal layer 2 and the substrate 4. Referring to FIG. 22, the modified reflective liquid crystal display device of this embodiment will be described.

The tilt member 107 placed between the liquid crystal layer 2 and the substrate 4 has a shape of alternate repetition of a plurality of tilt faces 140 tilted with respect to the display plane and faces 141 standing roughly at 90 degrees with respect to the display plane. The direction 107N normal to the tilt faces 140 of the tilt member 107 is tilted toward the upper side of the display plane (toward the light source 25) with respect to the direction 130 normal to the display plane. Moreover, as in the reflective display device 1 of Embodiment 1, convex portions made of a resin are formed on the plurality of tilt faces 140 of the tilt member 107, and the reflective pixel electrode 9 made of Al is formed on the convex portions. Alternatively, the reflective pixel electrode 9 may be a scattering film formed on the surface of a flat mirror.

In the reflective display device of FIG. 22, light 101 emitted from the light source 25 is reflected by the reflective pixel electrode 9, and outgoes as display light 104 in a direction roughly the same as the direction 130 normal to the display plane by use of the difference in refractive index between the air layer 105 and the prism array sheet 14.

Reflected light 102 of the incident light 101 from the light source 25, reflected at the interface between the air layer 105 and the polarizing plate 13, proceeds in a direction different from the direction of the display light 104 and is therefore separated from the display light 104, as shown in FIG. 22. Thus, good display is attained when viewed from the front.

Embodiment 10

A reflective display device of Embodiment 10 is different from the reflective display device of FIG. 20 as the comparative example of Embodiment 9, in that a protection plate 108 is provided on the back surface of the prism array sheet 14 and that an air layer 105 having a sufficiently large thickness is formed between the prism array sheet 14 and the polarizing plate 13. Such a reflective display device having a protection plate as in this embodiment is advantageous when used for cellular phones and portable game machines. The reflective display device of Embodiment 10 will be described with reference to FIG. 23.

The protection plate 108 is bonded to the back surface 122 of the prism array sheet 14, that is, the surface opposite to the surface having the plurality of tilt faces 120, as described above. This improves the abrasion resistance of the prism array sheet 14. The protection plate 108 is preferably made of a material with high light transmittance such as acrylic resin, polyvinyl alcohol, polycarbonate, and ARTON. The observer-side surface of the protection plate 108 is preferably subjected to anti-reflection treatment. By suppressing surface reflection, decrease in the amount of light incident on the display device can be prevented. Further, the refractive index of the protection plate 108 preferably matches with the refractive index of the prism array sheet 14, to enable suppression of reflection at the interface between the protection plate 108 and the prism array sheet 14.

Figure 23:
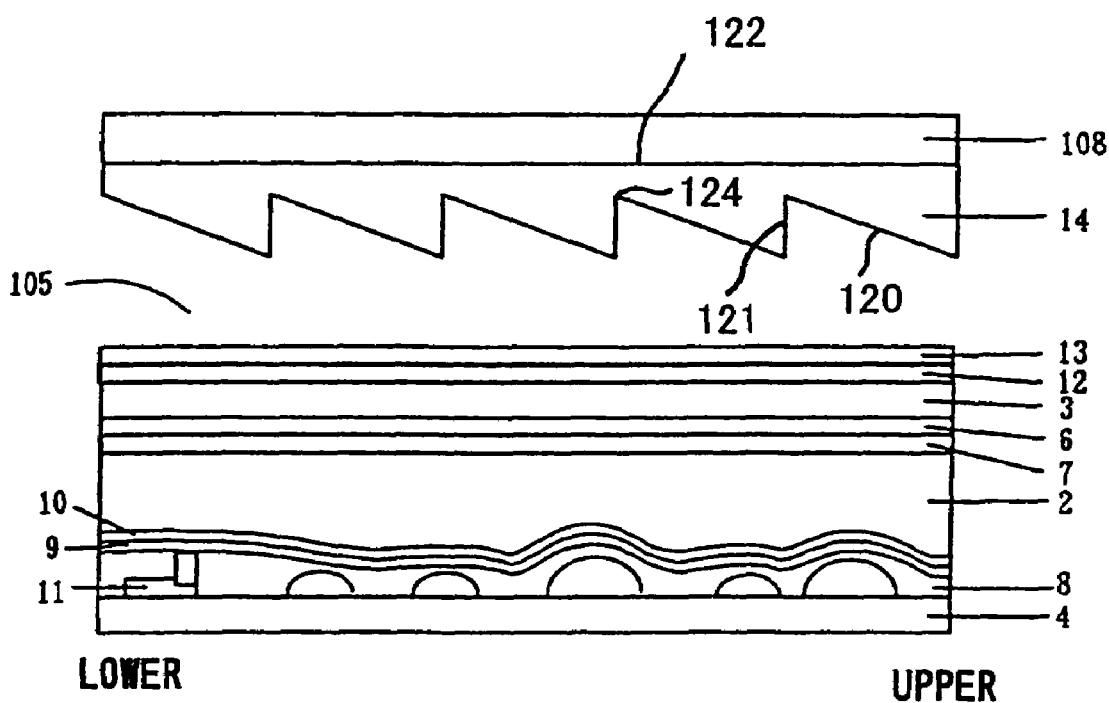
FIG. 23 is a schematic cross-sectional view of a reflective display device of Embodiment 10 of the present invention.

The reflective display device of FIG. 23 includes the air layer 105 having a sufficiently large thickness between the surface of the prism array sheet 14 having the plurality of tilt faces 120 and the polarizing plate 13 as described above. The thickness of the air layer 105 is preferably about 500 μm or more. A moiré pattern is generated due to interference between the periodic structure of the prism array sheet 14 and the pixel pattern of the display device. Therefore, by securing the air layer 105 having a thickness larger than the pitch of the prism array sheet 14 and the pixel pitch of the reflective display device, it is possible to prevent generation of a moiré pattern and thus improve the display quality.

Thus, the reflective display device of Embodiment 10 can improve the abrasion resistance of the prism array sheet 14 and also improve the display quality.

According to the reflective display device of the present invention, the prism array sheet is placed on the observer-side surface of a reflective display device, so that light incident on the display device is allowed to outgo in the direction normal to the display device in which the observer is normally present. With this placement, it is possible to attain a direct-view type reflective display device capable of providing display with high quality and high lightness in the actual use circumstance indoors or outdoors. It is also possible to fabricate a high-quality and bright reflective display device by a simple method with high productivity. Moreover, high-quality display without generation of a moiré pattern can be attained by appropriately setting the pitch of prisms considering the pixel pitch of the display device and the like.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A prism array sheet used for a reflective display device, wherein said prism array sheet is placed on said reflective display device on an observer side, a plurality of tilt faces tilted with respect to a display plane of said reflective display device are formed on said observer side so that apices of said prism array sheet point away from a display medium of the display device and said plurality of tilt faces are in contact with air, and an angle α of said plurality of tilt faces with respect to said display plane and a refractive index n1 of said prism array sheet satisfy $$2\alpha - \arcsin(\sin\alpha/n1) < \arcsin(1/n1).$$

2. The prism array sheet according to claim 1, wherein the angle α of said plurality of tilt faces is 7 degrees or more.

3. The reflective display device according to claim 1, wherein the angle of said plurality of tilt faces with respect to said display plane is set so that some of the light ray incident from a direction tilted by an angle in a range of about 10 degrees to about 45 degrees with respect to a direction normal to said display plane outgoes in a direction roughly normal to said display plane.

4. The prism array sheet according to claim 1, wherein said prism array sheet is made of an optically isotropic material.

5. A prism array sheet used for a reflective display device, wherein said prism array sheet is placed on said reflective display device on an observer side, a plurality of tilt faces tilted with respect to a display plane of said reflective display device are formed on said observer side, said plurality of tilt faces being in contact with air, an angle α of said plurality of tilt faces with respect to said display plane and a refractive index n1 of said prism array sheet satisfy $$2\alpha - \arcsin(\sin\alpha/n1) < \arcsin(1/n1)$$

wherein an out-going angle $\theta_{out}$ of a principal ray of light incident on said reflective display device from a direction normal to said display plane satisfies $$\theta_{out} = \arcsin[n1 \cdot \sin\{2\alpha - \arcsin(\sin\alpha/n1)\}] - \alpha \text{ and}$$

$$0° < \theta_{out} < (90-\alpha)°.$$

* * * * *